United States Patent
Roush et al.

(10) Patent No.: US 10,632,948 B2
(45) Date of Patent: Apr. 28, 2020

(54) STRAP UNDERRIDE GUARD

(71) Applicant: Vanguard National Trailer Corporation, Monon, IN (US)

(72) Inventors: Mark A Roush, Lafayette, IN (US); Hongrong Dong, Shandong (CN)

(73) Assignee: Vanguard National Trailer Corporation, Monon, IN (US)

( * ) Notice: Subject to any disclaimer, the term of this patent is extended or adjusted under 35 U.S.C. 154(b) by 261 days.

(21) Appl. No.: 15/845,900

(22) Filed: Dec. 18, 2017

(65) Prior Publication Data

US 2019/0184925 A1 Jun. 20, 2019

(51) Int. Cl.
| | |
|---|---|
| *B60R 19/56* | (2006.01) |
| *B62D 53/06* | (2006.01) |
| *B60R 19/03* | (2006.01) |
| *B60R 19/02* | (2006.01) |

(52) U.S. Cl.
CPC .......... *B60R 19/565* (2013.01); *B60R 19/023* (2013.01); *B60R 19/03* (2013.01); *B62D 53/06* (2013.01)

(58) Field of Classification Search
CPC ..... B60R 19/565; B60R 19/023; B60R 19/02; B60R 19/56
See application file for complete search history.

(56) References Cited

U.S. PATENT DOCUMENTS

| | | | |
|---|---|---|---|
| 1,236,354 A | 8/1917 | Ramussen | 254/242 |
| 2,526,438 A | 10/1950 | Walter | 30/510 |
| 2,679,755 A | 6/1954 | Mohnkern | 73/862.321 |
| 2,998,626 A | 9/1961 | Prete | 24/170 |
| 4,808,976 A | 2/1989 | Kiefer | 340/665 |
| 5,052,732 A | 10/1991 | Oplet | 293/102 |
| 6,039,376 A | 3/2000 | Lopreiato | 294/152 |
| 6,105,937 A | 8/2000 | Hay | 254/237 |
| 6,179,178 B1 | 1/2001 | Stegmeyer | 224/264 |
| 6,213,540 B1 | 4/2001 | Tusim | 296/187.02 |
| 6,450,556 B1 | 9/2002 | Jacobs | 293/107 |

(Continued)

FOREIGN PATENT DOCUMENTS

| | | |
|---|---|---|
| DE | 4142804 | 8/1992 |
| GB | 2172556 | 9/1986 |
| WO | WO2005115804 | 12/2005 |

OTHER PUBLICATIONS

Website https://www.collisionsafetyconsulting.com/trailerguard. Accessed Dec. 18, 2017.
Website https://www.collisionsafetyconsulting.com/media. Accessed Dec. 18, 2017.
Website https://www.collisionsafetyconsulting.com/trailerguard-rear. Accessed Dec. 18, 2017.

(Continued)

*Primary Examiner* — Joseph M Rocca
*Assistant Examiner* — Michael R Stabley
(74) *Attorney, Agent, or Firm* — Niro McAndrews, LLP

(57) ABSTRACT

Disclosed is a guard for a trailer that utilizes a strap webbing to prevent a vehicle from underriding the trailer. The guard includes one or more straps that span the length of the trailer and may include additional structures to pre-tension the straps before a crash or supplement the tension of the straps as a vehicle crashes into the guard. When two or more straps are utilized on a single guard, the straps may be aligned parallel to each other or may form a cross shape. Additional structures may be incorporated into the guard to direct an impacting vehicle towards or away from specific features of the trailer.

19 Claims, 21 Drawing Sheets

(56) References Cited

U.S. PATENT DOCUMENTS

| | | | | |
|---|---|---|---|---|
| 7,407,204 B2* | 8/2008 | Eriksson | ............... | B60R 19/565 |
| | | | | 293/102 |
| 7,748,772 B2 | 7/2010 | Boivin | ....................... | 296/180.4 |
| 7,887,120 B2 | 2/2011 | Boivin | ....................... | 296/180.4 |
| 7,967,349 B2 | 6/2011 | Puppini | ......................... | 293/107 |
| 8,162,384 B2 | 4/2012 | Giromini | ................... | 296/180.4 |
| 8,177,286 B2 | 5/2012 | Brown | ....................... | 296/180.4 |
| 8,398,150 B2 | 3/2013 | Brown | ....................... | 296/180.4 |
| 8,579,359 B2 | 11/2013 | Brown | ....................... | 296/180.4 |
| 8,801,078 B2 | 8/2014 | Brown | ....................... | 296/180.4 |
| 9,199,676 B2 | 12/2015 | Brown | | |
| 9,296,433 B2 | 3/2016 | Roush | | |
| 9,440,689 B1 | 9/2016 | Smith | | |
| 9,463,759 B1 | 10/2016 | Kiefer | | |
| 9,487,171 B2 | 11/2016 | Rogers | | |
| 9,764,781 B2* | 9/2017 | Bezner | ................. | B62D 35/001 |
| 2006/0000068 A1 | 1/2006 | Fraser | ............................ | 24/442 |

OTHER PUBLICATIONS

Evaluation of Energy Absorbing Pliers Underride Guards for Rear and Side of Large Trucks. 2004 Masters Thesis by Venkata Kiran Kumar Bodapati. Department of Mechanical Engineering, Wichita State University.

Website http://www.fem.unicamp.br/~impact/INTELLIGUARD.html. Accessed Dec. 18, 2017.

Mariolani, J.R.L., Schmutzler, L.O.F., and Arruda, A.C.F., "Development of New Underride Guards for Enhancement of Compatibility between Trucks and Cars," 17th International Technical Conference on the Enhanced Safety of Vehicles (ESV 2001), Amsterdam, The Netherlands, Jun. 4-7, 2001.

Bloch, B., and Schmutzler, d Crashworthy Designs for Truck Underride Guards, 16th International Technical Conference on the Enhanced Safety of Vehicles (ESV 1998), Windsor, Ontario, Canada, Oct. 1998.

\* cited by examiner

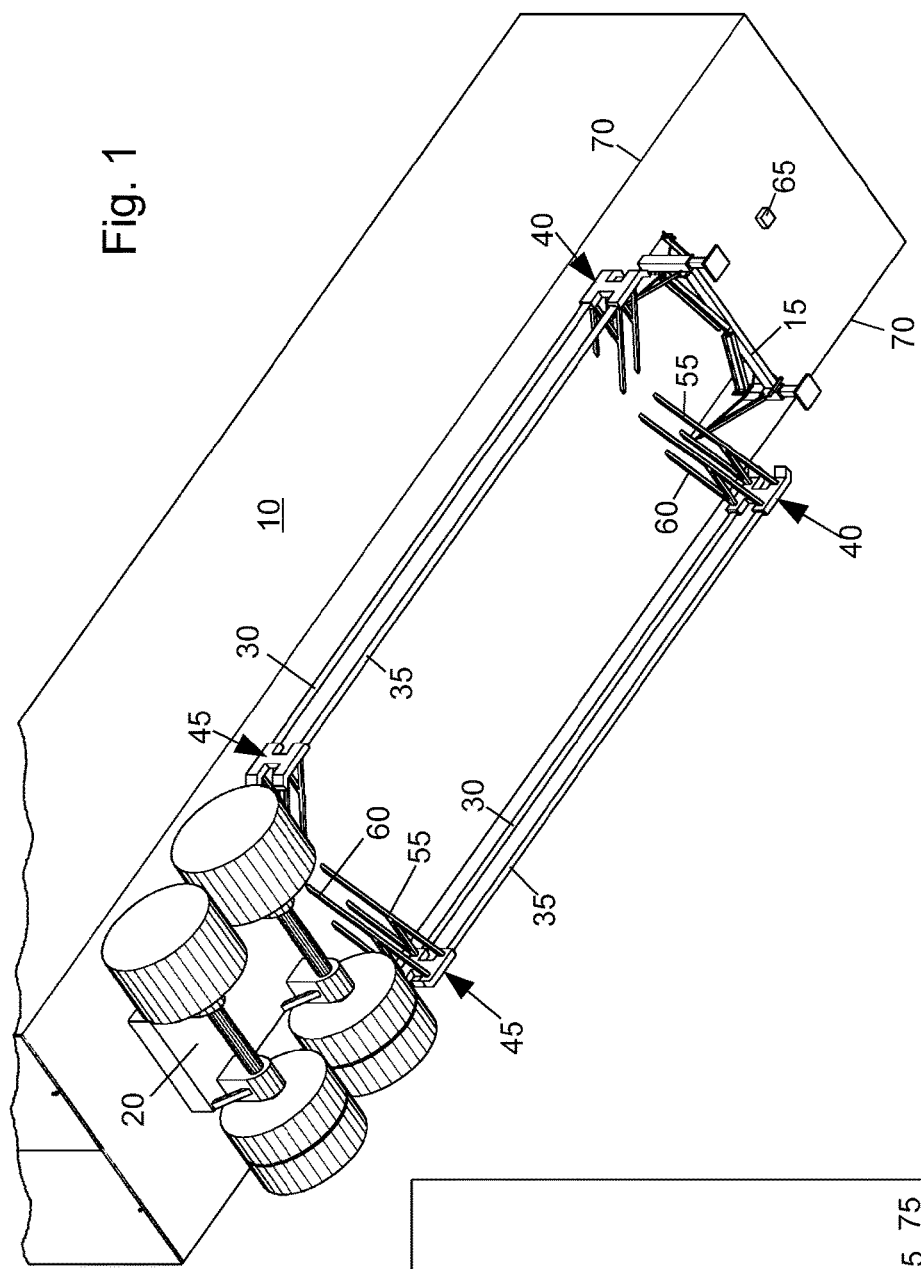
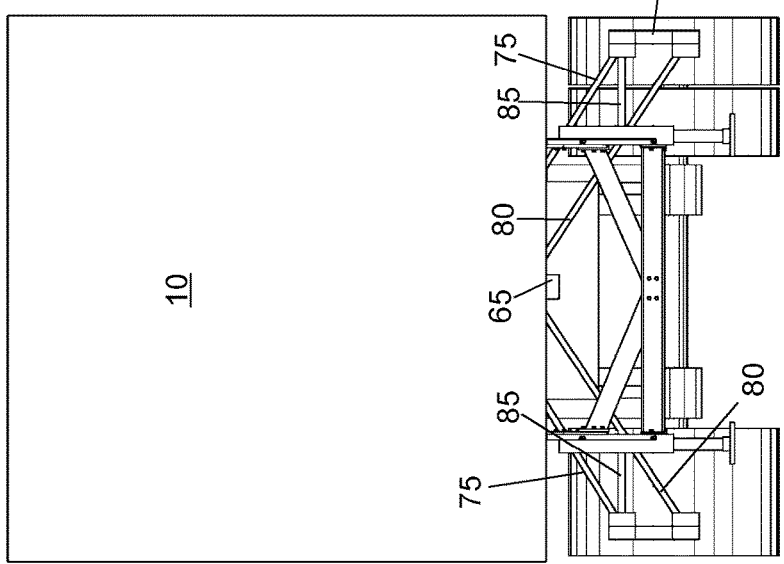

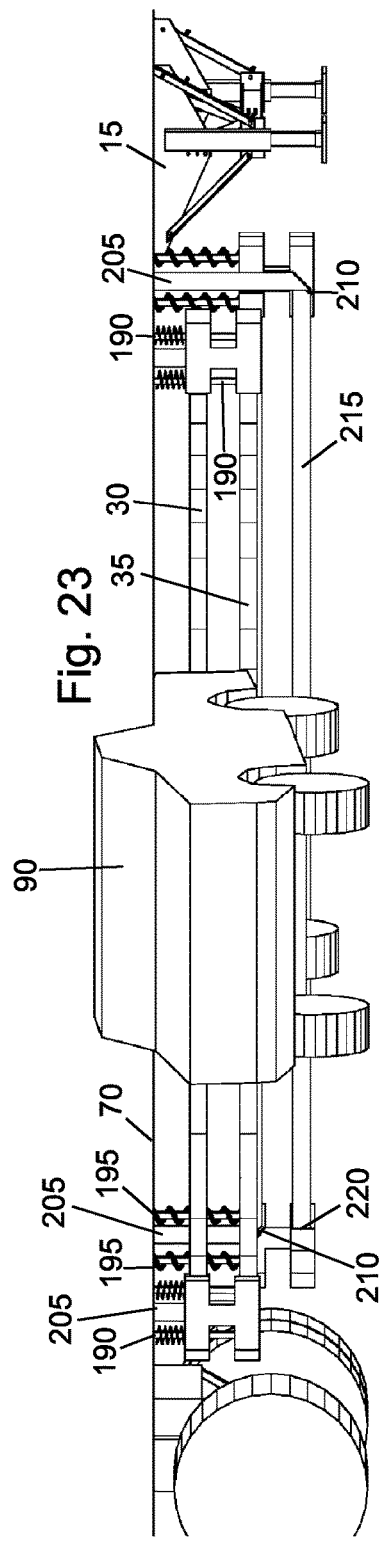
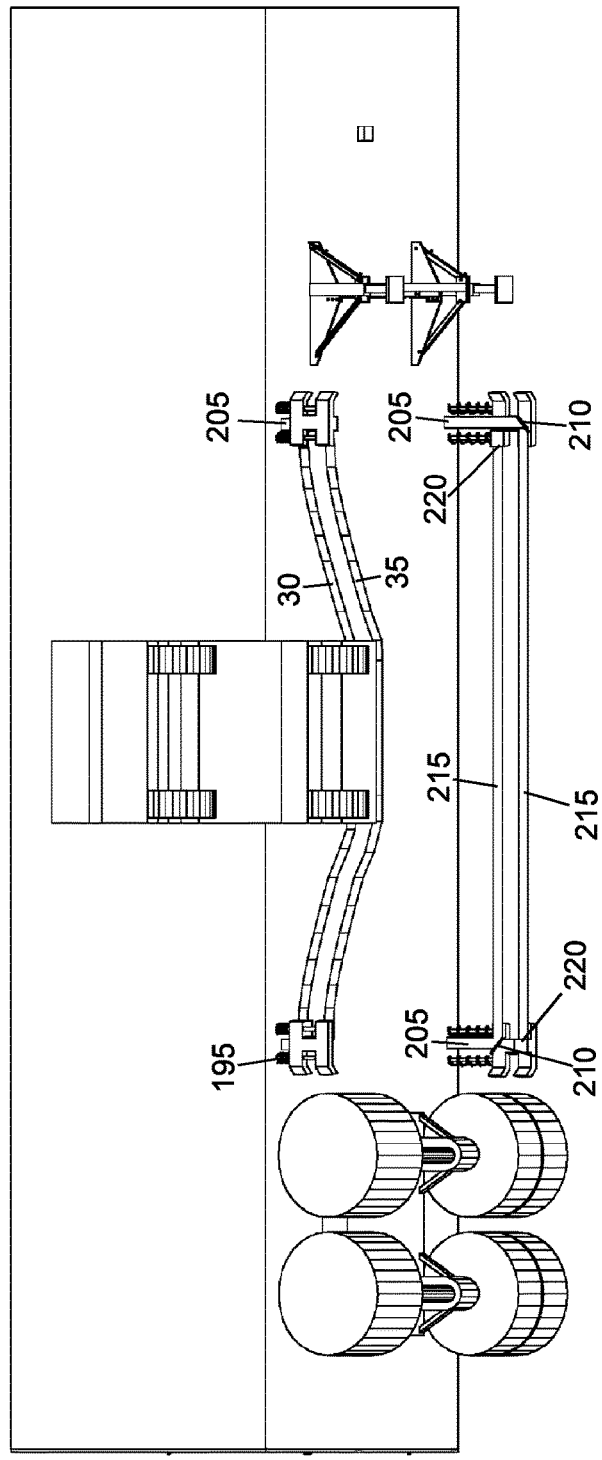

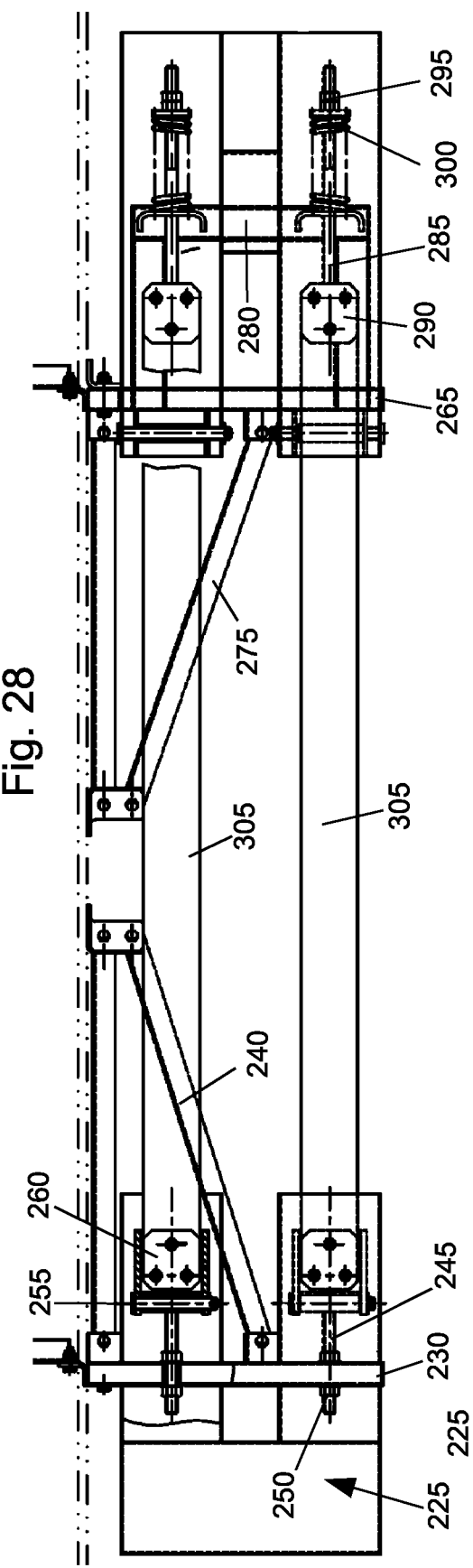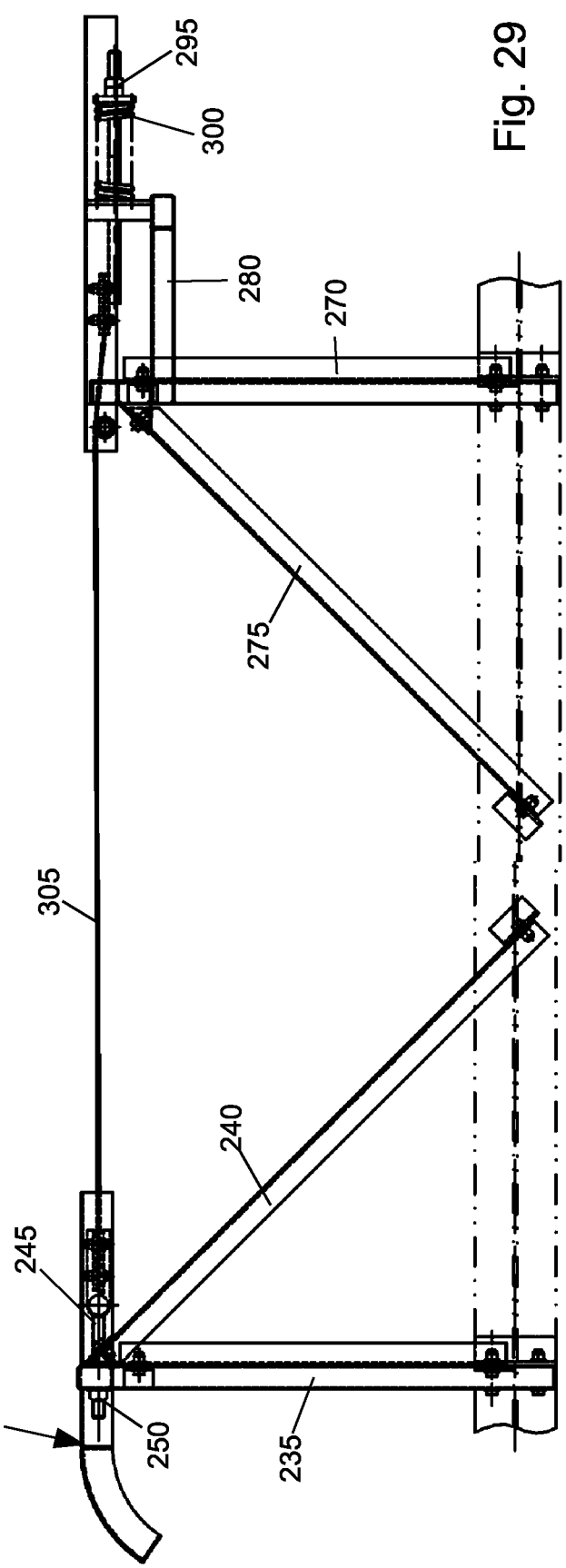

STRAP UNDERRIDE GUARD

FIELD OF THE INVENTION

This invention relates to crash attenuators for cargo containers. More specifically, it relates to strap based crash attenuating underride guards for the underside of a tractor pulled trailer.

BACKGROUND OF THE INVENTION

Crash attenuators are energy absorbing systems that reduce the severity of vehicular collisions, especially the type involving a fast-moving motor vehicle and a road barrier or a highway trailer vehicle. The success of crash impact attenuators is measured by the ability of the devices to limit the extent of injuries suffered by people and the damage done by the equipment as a consequence of such collisions.

Truck trailers typically have a higher elevation than passenger vehicles. This presents a risk that a passenger vehicle will underride the trailer in an accident, potentially resulting in damage to the underriding vehicle and injury to occupants therein. Accordingly, the United States Federal Motor Vehicle Safety Standards require the installation of underride guards or bumpers on certain trailers. The underride guards must comply with certain deflection and energy absorption requirements. Underride guards are common on the rear of trailers; however, underride guards between the landing gear and wheel assembly of the trailer are less common.

A device positioned between the landing gear and wheel assembly of the trailer can function to prevent an impacting vehicle from underriding the trailer. Additionally, such a device can have features to reduce the aerodynamic drag on the trailer.

There have been attempts to address the issues of side underrides. For example, U.S. Pat. No. 5,052,732 that issued to Oplet claims to teach "a crash attenuator [that] includes a plurality of layers . . . of fibrous cellular material. Each of the layers is comprised of a plurality of hexagonal elongate cells fabricated of a fibrous cellulose material that has a longitudinal axis that is disposed horizontal to the ground such that the edge of the cell is directed toward the impacting vehicle. A flat sheet of fibrous material . . . is disposed between each of the layers to provide an energy dispersing surface. A rear impact plate . . . is disposed on the impacting end of the crash attenuator . . . and is fabricated from a soft metal. A front mounting plate . . . is disposed on the opposite end thereof and the two secured by tension cables . . . . The exterior of the layers . . . is covered by sheets . . . . Thereafter, a layer of moisture proof material . . . is disposed over the surface of the crash attenuator . . . to prevent moisture from entering the interior."

U.S. Pat. No. 6,213,540 that issued to Tusim claims to teach "an energy absorbing article . . . formed of extruded thermoplastic foam . . . [that exhibits high] anisotropic compressive strength. The extrusion direction of the thermoplastic foam is aligned substantially parallel with the direction in which impact resistance is desired to provide an energy absorbing article exhibiting a high ratio of compressive strength to weight."

U.S. Pat. No. 6,450,556 that issued to Jacobs claims to teach "an external vehicle airbag system . . . , a method of its use and a principal vehicle . . . on which it is mounted [that] involves mounting an airbag . . . at a bottom side . . . of the principal vehicle at a position spaced substantially laterally inwardly from a lateral-side periphery . . . of the principal vehicle. Also involved is a sensor . . . for being mounted on the principal vehicle at a position more laterally outwardly, in a direction toward the lateral-side periphery, than is the airbag. The sensor senses a collision of the principal vehicle with a colliding vehicle and, in response thereto, inflates the airbag below the principal vehicle, along the bottom thereof toward the lateral-side periphery, to thereby absorb energy from the colliding vehicle and prevent under-riding. In one embodiment, the sensor is positioned approximately at the lateral-side periphery and it can be mounted on a rigid under-ride guard."

German Patent Application Publication No. DE4142804 that issued to Eble claims to teach a "bottom part of the vehicle, between the wheels, . . . [that] is fitted with a tubular frame . . . to which are clipped side panels . . . . These protect pedestrians etc. from running under the vehicle . . . . The panels are removable to access storage lockers, spare wheels etc. The tubular frames . . . have horizontal rails . . . along which the panels can slide. The panels are fitted via clips . . . . The upper mounting can be flexible . . . to enable the panels to be swung up for access to the chassis."

British Patent Application Publication No. GB2172556 that issued to Brown claims to teach "a sideguard assembly for a commercial vehicle . . . [The sideguard assembly] has a side rail assembly consisting of two parallel spaced apart side rails . . . secured together at one end by a vertical post . . . extending therebetween, the assembly being releasably connected to one or more brackets . . . which in turn are connected to the cross members . . . on the vehicles chassis. The position of connection of the side rail assembly to the brackets is adjustable and the position of connection of the brackets to the vehicles cross members is also adjustable to suit different vehicles."

World Intellectual Property Organization Patent Application Publication No. WO2005115804 that issued to Ericksson claims to teach "an arrangement for a vehicle side underrun protection comprising at least one loadbearing member, which extends between the wheels or sets of wheels of the vehicle in the longitudinal direction thereof and basically along the outer contour of the vehicle, and which serves as side impact protection and/or protection to prevent unprotected road-users ending up under the vehicle. The side underrun protection . . . comprises at least one longitudinal section . . . suspended in at least two first brackets . . . fixed to the vehicle, along which brackets . . . at least one end of each individual section . . . of the side underrun protection . . . is vertically adjustable from at least a first, active position to a second, inactive position. The invention also relates to a vehicle provided with such a side underrun protection."

U.S. Pat. No. 8,162,384 that issued to Giromini claims to teach "a side underride cable system configured to be coupled to a trailer includes a front mounting bracket assembly configured to be coupled to the trailer, a rear mounting bracket assembly configured to be coupled to the trailer at a location spaced-apart from the front mounting racket assembly, and a plurality of cables configured to extend at least partially along a length of each side of the trailer between the front mounting bracket assembly and the rear mounting bracket assembly."

Venkata Kiran Kumar Bodapati's 2004 Master's Thesis titled "Evaluation of Energy Absorbing Pliers Underride Guards for Rear and Side of Large trucks" claims to disclose "two new guards for rear and side [that] are modeled using MSC-Patran and the performance of the guard in preventing passenger compartment intrusion is analyzed using LS-Dyna. A zero-passenger compartment intrusion is achieved with the employment of the newly designed underride guards for rear and side of the trucks. The newly designed guard models are validated using FMVSS 223/224 regulations. The results are in good correlation with the experimental data for rear and the passenger compartment intrusions are reduced in the case of rear and side underride. The performance of the guard is studied at 30, 40 and 50 miles per hour."

SUMMARY OF THE INVENTION

Disclosed is an improved strap based underride guard. The guard includes one or more straps that span the length of the trailer and may include additional structures to pre-tension the straps before a crash or supplement the tension of the straps as a vehicle crashes into the guard. When two or more straps are utilized on a single guard, the straps may be aligned parallel to each other or may form a cross shape. Additional structures may be incorporated into the guard to direct an impacting vehicle towards or away from specific features of the trailer.

BRIEF DESCRIPTION OF THE DRAWINGS

FIG. 1 shows a lower perspective view of two dual strap underride guards secured below a cargo trailer.

FIG. 2 shows a front view of two dual strap underride guards secured below a cargo trailer.

FIG. 23 shows a side perspective view of a vehicle impacting a lifting dual strap underride guard.

FIG. 24 shows a lower perspective view of a vehicle impacting a lifting dual strap underride guard.

FIG. 28 shows a side elevational view of a spring mounted dual strap underride guard.

FIG. 29 shows a top plan view of a spring mounted dual strap underride guard.

DETAILED DESCRIPTION

Figure 3:
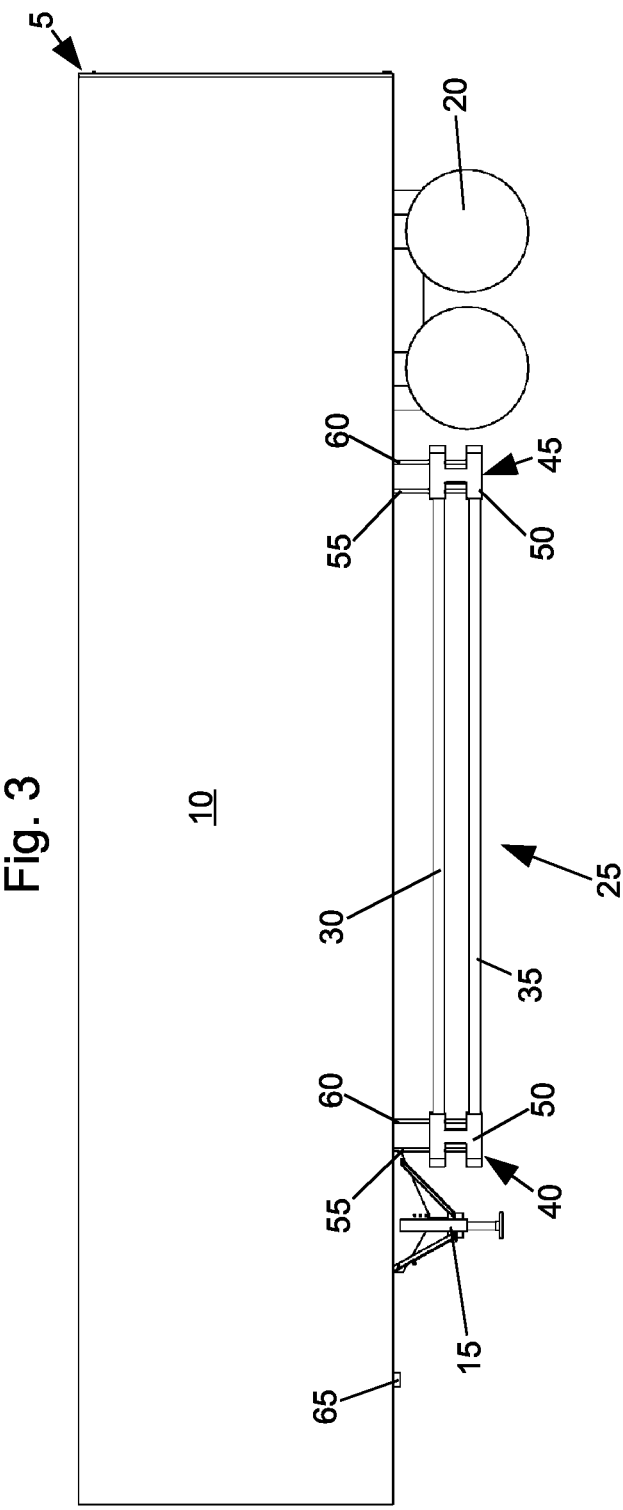
FIG. 3 shows a side elevational view of two dual strap underride guards secured below a cargo trailer.
Figure 4:
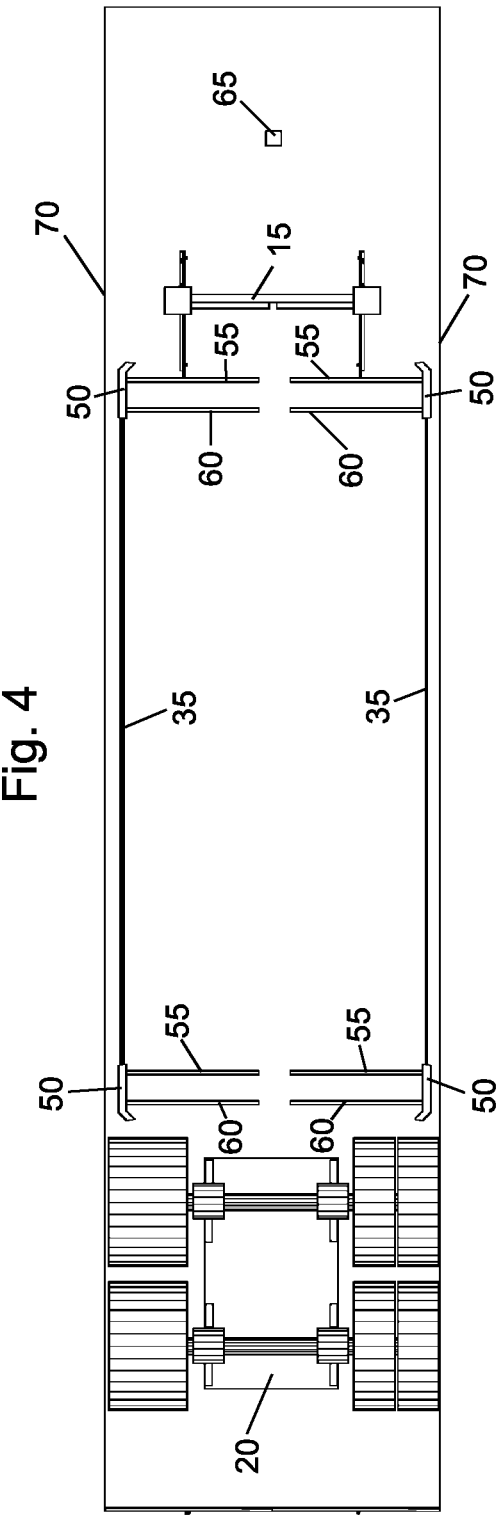
FIG. 4 shows a lower plan view of two dual strap underride guards secured below a cargo trailer.
Figure 5:
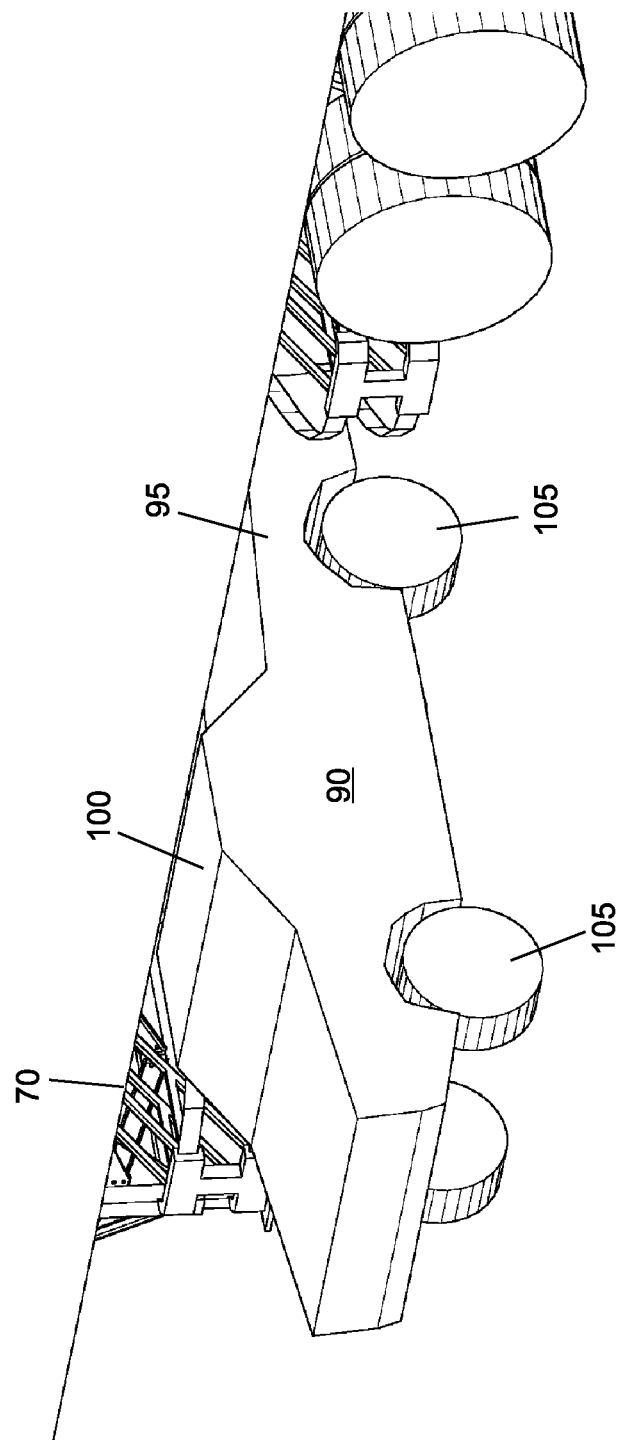
FIG. 5 shows an upper perspective view of a vehicle impacting a dual strap underride guard.
Figure 6:
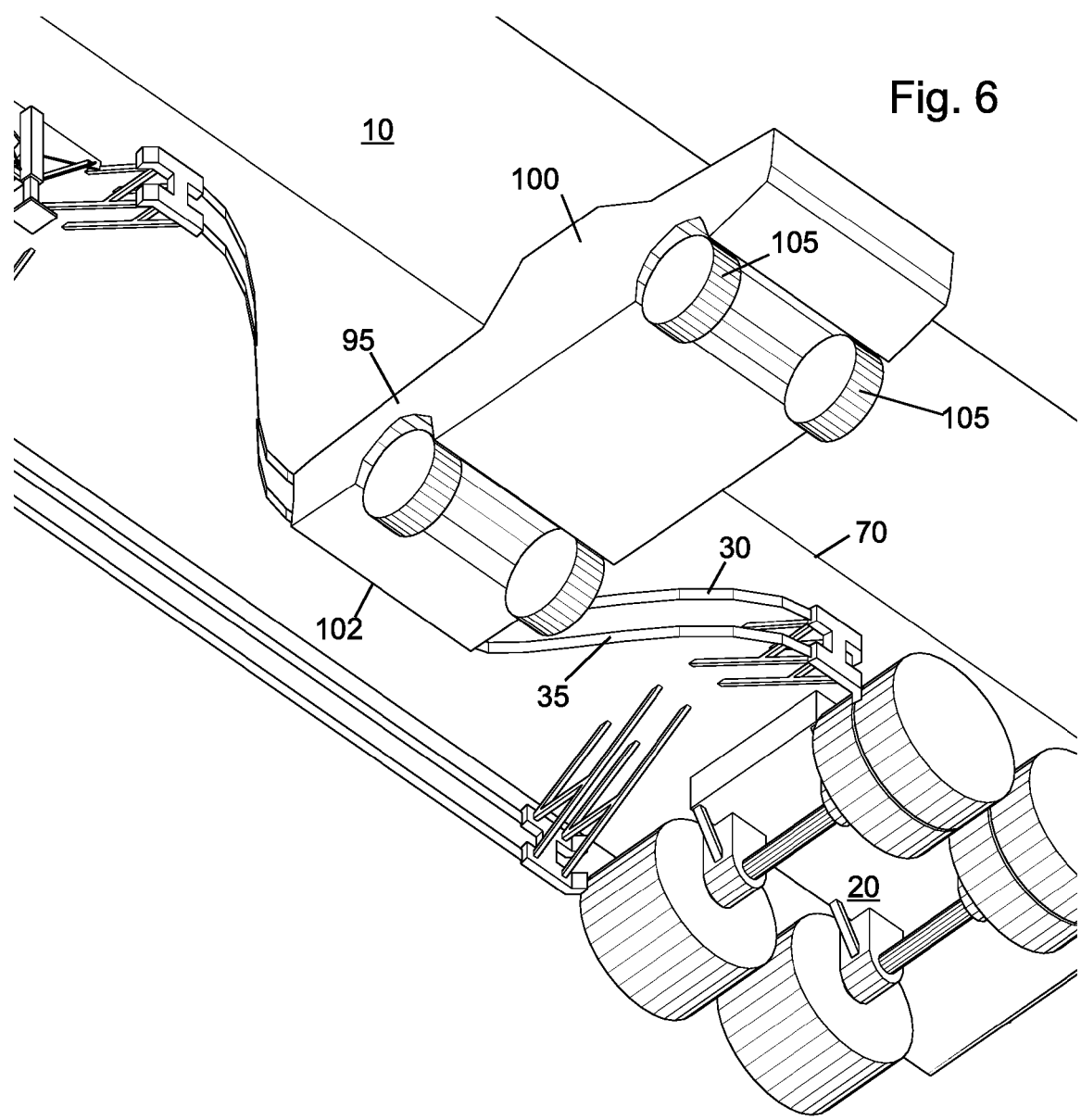
FIG. 6 shows a lower perspective view of a vehicle impacting a dual strap underride guard.
Figure 7:
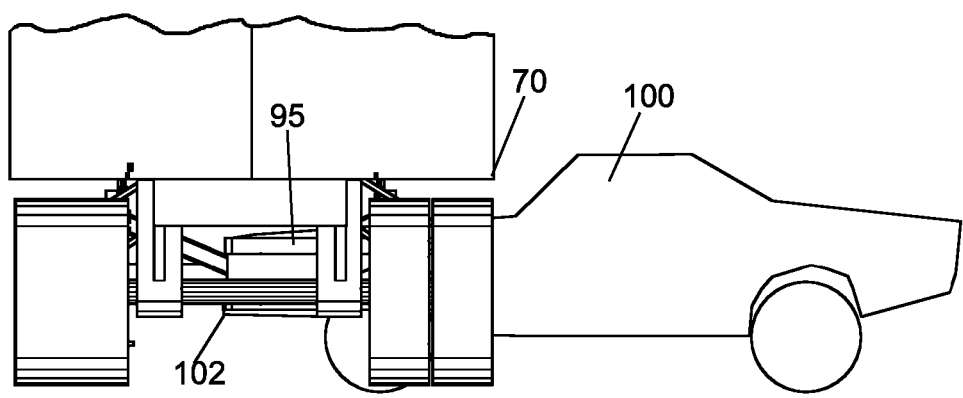
FIG. 7 shows a rear elevational view of a vehicle impacting a dual strap underride guard.
Figure 8:
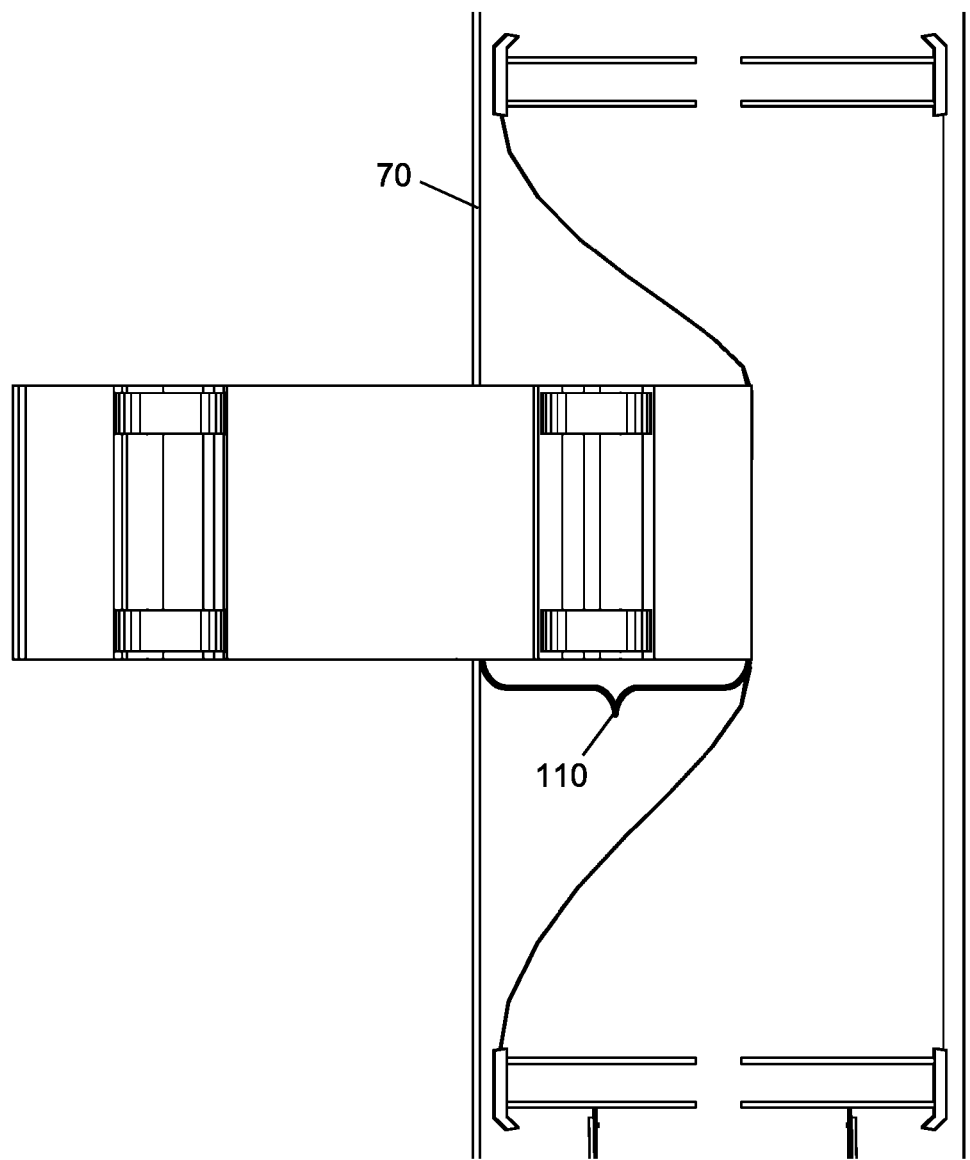
FIG. 8 shows a lower plan view of a vehicle impacting a dual strap underride guard.

The present invention may be used in association with any structure having the potential for a vehicle or pedestrian underride, however for the purposes of this application, the invention will be primarily described in association with an over-the-road trailer.

FIGS. 1 through 4 show a trailer 5 having a cargo storage area 10 or cargo container supported by landing gear 15 and a wheel assembly 20. Between the landing gear 15 and the wheel assembly 20 is located an underride guard 25 comprising an upper strap 30 and a lower strap 35 stretched between a fore support 40 and an aft support 45. The fore and aft supports (40, 45) each include I-connectors 50 structured to receive and tension the upper and lower straps (30, 35). The I-connectors 50 are secured to the underside of the cargo storage area 10 by fore and aft bar structures (55, 60).

In the illustrated example of FIGS. 1-4, the fore and aft supports (40, 45) are positioned in close proximity to the either the wheel assembly 20 or the landing gear 15 such that substantially all of the area below the cargo storage area is protected from underride by at least one structure. While not shown, in transport, a tractor connects to the kingpin 65 and the wheels of the tractor prevent underrides in the area in front of the landing gear. In alternate embodiments of the invention, the fore support 40 may be located in front of the landing gear 15 and/or the aft structure 45 may be located behind the wheel assembly 20.

An advantage of using straps as an underride guard is that they may be easily replaced or removed when needed. While placing a more immovable structure in front of the wheel assembly would make changing a tire difficult and extremely time consuming, the straps of an underride guard are easily removable/replaceable. While the wheel assembly 20 by itself may act to prevent automobile underrides in the area of the wheel assembly 20, motorcycles, bicycles, and pedestrians can still underride the exposed wheels. By extending the straps past the wheels, the chances of a motorcycle underride occurring are reduced.

The upper and lower straps (30, 35) are shown in close proximity to the lower side edges 70 of the cargo storage area 10. In the illustrated example of FIGS. 1-4, the straps are positioned horizontally interior of the lower side edges 70 in order to reduce the likelihood of road debris, or a car in an adjacent lane, striking either the straps (30, 35) or the supports (40, 45). In another embodiment of the invention, the straps (30, 35) and supports (40, 45) are positioned slightly horizontally exterior to the lower side edges 70 such that in the case of a vehicle impact, the deceleration of the vehicle would begin before any portion of the vehicle was below the cargo storage area 10.

A variety of different connections may be utilized between the straps and the fore and aft supports. In one embodiment, the straps include hooks and ratcheting mechanisms similar to standard tie downs used to secure cargo on a flatbed trailer. In such an example, the aft and fore connectors may include eyelets adapted to receive the hooks of the straps. In another example, the tensioning mechanism is included within the I-connector structure. In one example, the I-connectors include a hacksaw type tensioning mechanism with a post secured to a threaded screw that extends through a hole in the I-connector. A loop of the strap is secured around the post, and rotation of a nut adjacent to the hole pulls on the post to tension the strap. An example of an adjustable hacksaw frame is found in U.S. Pat. No. 2,526,438 issued to Thompson, the contents of which are herein incorporated by reference with FIG. 9 and its associated text specifically incorporated by reference.

In another example, the fore and aft supports use a wire stretcher/puller type structure to tension the wire. An example of wire stretcher/puller is found in U.S. Pat. No. 6,105,937 issued to Hay, the contents of which are herein incorporated by reference with FIG. 2 and its associated text specifically incorporated by reference. Another example of a wire puller is found in U.S. Pat. No. 1,236,354 issued to Ramussen, the contents of which are herein incorporated by reference with FIG. 1 and its associated text specifically incorporated by reference.

In some embodiments of the invention, the straps include end loops that are secured around movable posts or other structures to allow for tensioning of the strap. With a hacksaw type tensioner on the fore and aft supports, the straps include end loops that are secured around appropriately sized posts or supporting pins (33a in U.S. Pat. No. 2,526,438). Examples of strap end loops are found in items 2, 3, 100, and 101 of U.S. Pat. No. 6,039,376 issued to Lopreiato, the contents of which are herein incorporated by reference. Alternatively, the fore and aft supports may include clamping structures that secure the straps to the fore and aft supports. An example of a clamping structure is found in FIG. 1 of U.S. Pat. No. 2,998,626 issued to Prete, the contents of which are herein incorporated by reference.

In the illustrated example of FIGS. 1 through 4, the fore and aft supports each include an I-connector 50 that is secured to the upper and lower straps (30, 35). While I-shaped connectors are used in the illustrated example, it should be appreciated that a variety of shaped connectors may be utilized. For example, the connectors may be cylindrical with internal bobbins for winding the straps.

In the embodiment shown in FIGS. 1 through 4, the fore and aft support structures (55, 60) each include an upper angled bar 75, a lower angled bar 80, and a horizontal bar 85. The upper angled bar 75 is secured to both the underside of the cargo storage area 10 and the upper portion of the I-connector 50 while the lower angled bar 80 is secured to the underside of the cargo storage area 10 and the lower portion of the I-connector 50. From the I-Connector 50 and the upper angled bar 75 the horizontal bar 85 or brace extends to the lower angled bar 80. The bars (75, 80, 85) act to keep the I-connector 50 substantially stable in the event of a vehicle impacting the straps (30, 35) or the I-connectors 50. While the illustrated example of FIGS. 1-4 shows two support structures that are generally parallel to each other, it should be appreciated that additional structures or alternative designs of support structures may be utilized within the scope of the invention. In one embodiment, the fore and aft support structures extend away from the I-connector at approximately 45 degrees from each other with one of the structures extending perpendicularly away from the side edge 70 of the cargo container 10. By angling one of the support structures (55, 60) to be at a 45-degree angle to the straps (30, 35) instead of perpendicular, the support structures may be better able to resist the forces applied by a vehicle impacting the straps.

A variety of constructions may be utilized for the upper and lower straps (30, 35). In one example, each of the straps (30, 35) is constructed from two or more individual polyester webbings that are each four inches tall with a breaking strength of 24,000 pounds. An example of such webbing is the 4" Polyester Webbing model number 747Y-4-100 from Cargo Equipment Corporation of Huntley, Ill. While other types of materials, such as Nylon and Polypropylene, may be utilized to construct the straps, it is expected that most embodiments of the invention will utilize at least some low stretching materials, such as Polyester. While some embodiments of the invention will utilize the same construction for both the upper and lower straps, others will utilize different materials in the straps. For example, in one embodiment, the upper strap may be a Nylon blend that is configured to stretch substantially more than the Polyester lower strap such that the unequal stopping forces act to direct the crashing vehicle towards a safety feature. In yet another embodiment of the invention, both the upper and lower straps are constructed from the same material, but the lower strap is coated with a water-resistant material to help protect it from potentially abrasive road spray and debris. Polyester may stretch 5 to 15 percent under load, so in a preferred embodiment of the invention the straps are pre-tensioned with a load to minimize further stretching upon vehicle impact. In one embodiment, the straps are pre-tensioned with at least 1,000 pounds of tension. In an exemplary embodiment of the invention, the straps a height to thickness ratio of at least 10 to 1, such that a 2.5 inch tall strap would have a thickness of no more than a quarter of an inch.

In addition to utilizing a variety of materials for construction, the upper and lower straps may also include structures to assist with underride prevention or trailer aerodynamics. In one embodiment, a plurality of bars or cleats are embedded within the straps to help the straps grasp and hold onto an impacting vehicle. For example, in the case of a low riding car, the upper strap may initially contact directly below the upper front edge of the car's hood. If the car has an aerodynamic sloping front, the upper strap may slide upwards above the hood of the car rendering the strap ineffective in stopping the car. Embedded small bars or cleats in the strap act to dig into the front structures of the vehicle to prevent the straps from sliding up or down to an elevation where the straps are not effective is stopping the impacting vehicle. In another embodiment of the invention, an abrasive metal wire runs in a zig-zag pattern the length of the strap to help prevent the strap from slipping from an impacting vehicle. Examples of a non-slip structure embedded in a strap are found in item 10 of U.S. Patent Publication No. 2006/0000068 by Fraser and item 22 in U.S. Pat. No. 6,179,178 issued to Stegmeyer, the contents of which are herein incorporated by reference.

The upper and lower straps may also include structures that secure to and support aerodynamic fairings to reduce aerodynamic drag. In one embodiment of the invention, the fasteners are secured to the upper and lower straps along the length of the trailer, and an aerodynamic skirt, such as items 32 and 36 in U.S. Pat. No. 7,887,120 issued to Boivin (herein incorporated by reference). In U.S. Pat. No. 7,887,120 glue, resin, bolts and rivets are disclosed as possible fasteners between the trailer skirt and supports, and similar connections may be used with the present invention. Additionally, the fasteners may be constructed of webbing material similar to that of the upper and lower straps.

In the illustrated example of FIGS. 1 through 4, two straps, an upper and lower strap, are utilized to prevent vehicles from underrunning each side of the cargo container. In an alternate embodiment, three or more distinct straps are utilized on each side of the trailer to prevent underrides. If a sufficient number of straps are utilized, the straps themselves may act as a trailer side skirt and reduce the aerodynamic drag of the trailer as it moves. Alternatively, a single large strap may be utilized on each side of the trailer. In the illustrated example, the straps extend from approximately the wheel assembly to the landing gear, however in alternate embodiments multiple distinct groupings may be used. For example, in one embodiment, a first set of upper and lower straps spans from the wheel assembly to the mid-point of the trailer while a second set of upper and lower straps span from the mid-point to the landing gear of the trailer.

FIGS. 5 through 8 illustrate a vehicle 90 impacting the trailer and underride guard shown in FIGS. 1 through 4. The vehicle 90 includes a front compartment 95 that may be the engine compartment, a passenger compartment 100, and four wheels 105. In the impact, the front end 102 of the vehicle 90 impacts the upper and/or lower straps (30, 35). Upon impact, the vehicle 90 stretches the straps (30, 35) towards the opposite lower side edge 70 of the trailer, and the straps respond by exerting an opposing decelerating force upon the vehicle 90.

At initial impact with the straps (30, 35), the decelerating force applied by the straps is relatively small, however as the straps stretch further the decelerating force applied will scale approximately linearly with the amount of stretch based on Hooke's law. The absolute force applied by the straps will be equal to the amount of stretch caused by pre-tensioning of the strap and the vehicle, multiplied by the spring constant of the strap. The total change in momentum of the vehicle will be equal to the integral of the forces applied by the stretching straps over the time of the collision.

In the illustrated example, the vehicle 90 stopped after traveling a distance 110 under the cargo container 10. The spring constants and preloading of the straps are preferably selected such that the distance traveled 110 is less than the distance from the front end 105 of the vehicle to the passenger compartment 100 when the vehicle has a preselected rate of speed. In one exemplary embodiment, the pre-tensioning of the straps is selected such that a 2017 Chevrolet Spark, with a weight of 2,300 lbs. traveling at 30 MPH will only underrun the cargo container by 3 feet or less before the straps stop the vehicle.

Figure 9:
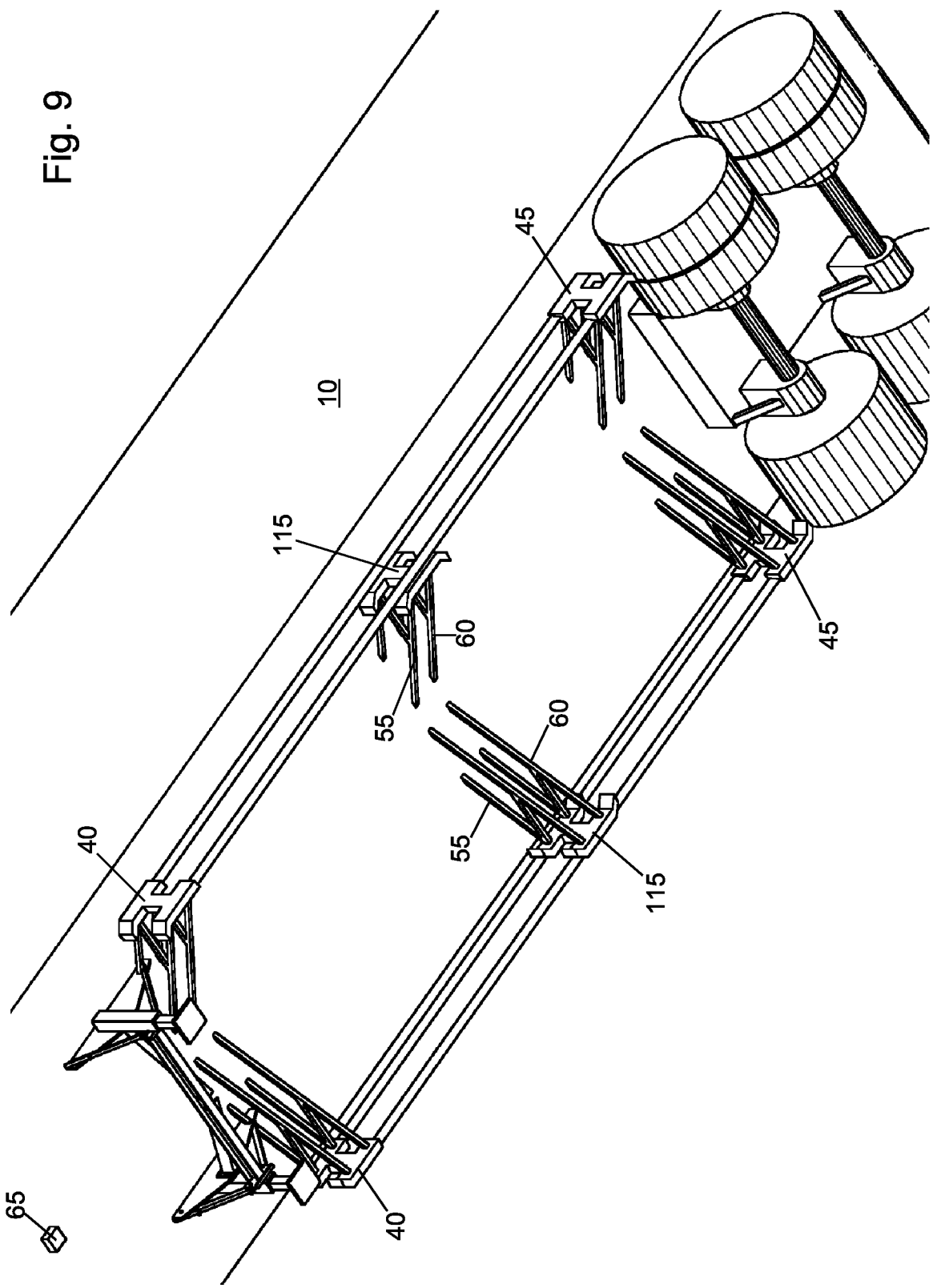
FIG. 9 shows a lower perspective view of a dual strap underride guard having an intermediary support structure.
Figure 10:
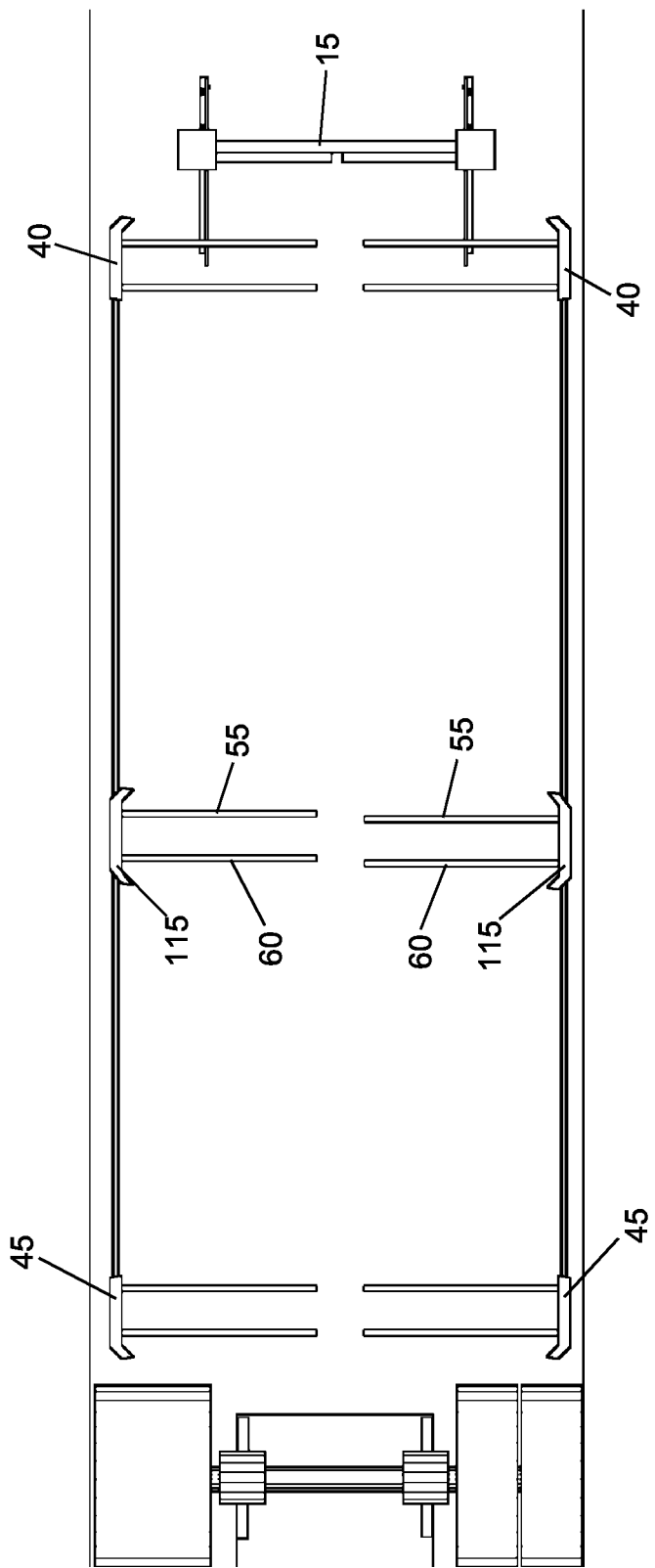
FIG. 10 shows a lower plan view of a dual strap underride guard having an intermediary support structure.

FIGS. 9 and 10 illustrate an embodiment with a mid-support 115 located between the fore support 40 and the aft support 45. While the fore and aft supports (40, 45) act to tension the straps (30, 35), the mid-support 115 primarily functions to increase the amount of strap stretching that occurs per distance underrun. For example, assuming the straps of FIGS. 1 through 8 have a 20-foot span, for a vehicle to underrun the center of the cargo container by 4 feet requires the straps to stretch approximately a foot and a half ($2\times[[10^2+4^2]^{1/2}-10]$). In contrast, for the same vehicle to underrun the cargo container 10 at the mid-point between the aft support 45 and the mid-support 115 would require a stretch of almost three feet ($2\times[[5^2+4^2]^{1/2}-5]$). Additionally, the mid-support 115 will also help to prevent underrides if struck directly by a vehicle.

Figure 11:
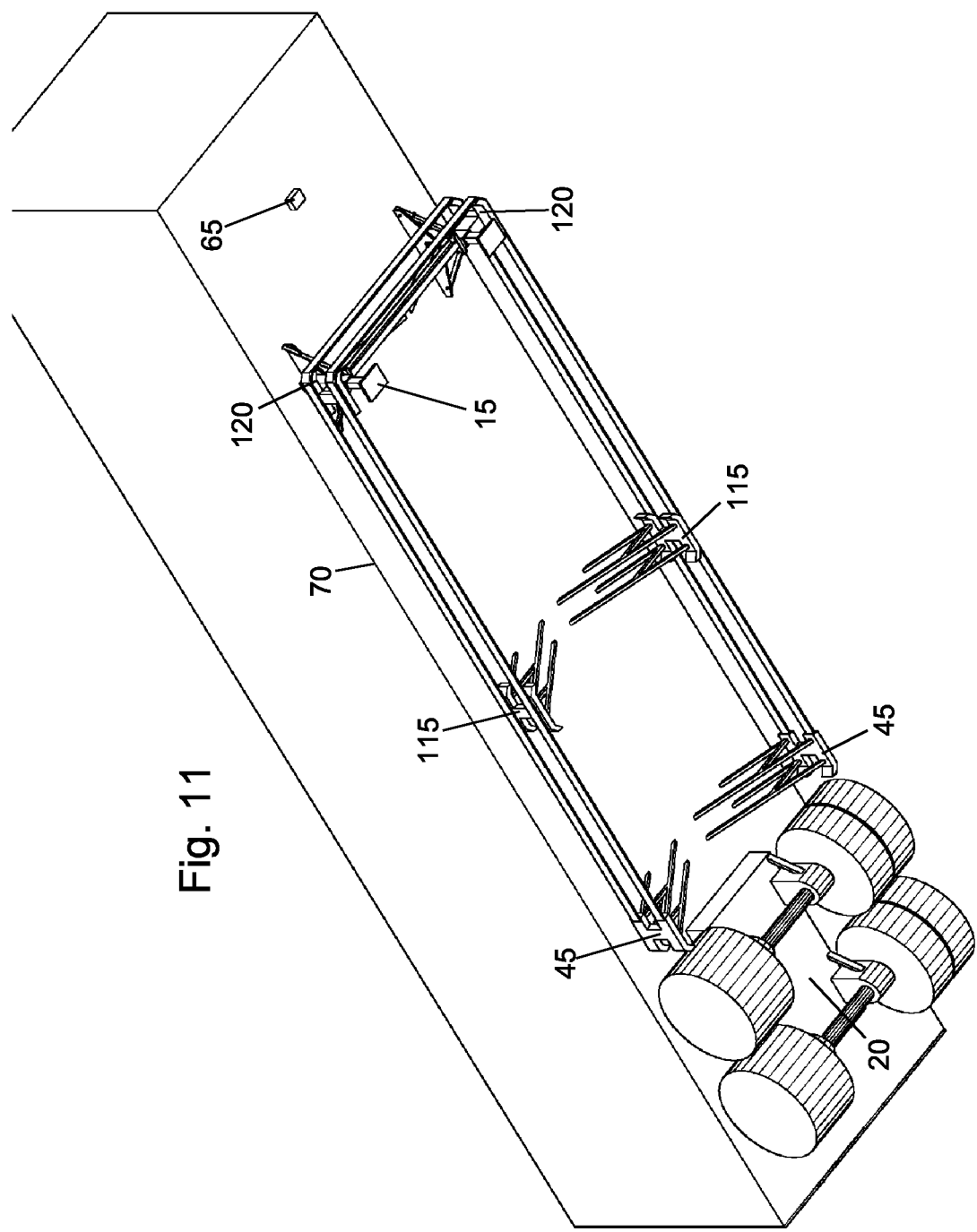
FIG. 11 shows a lower perspective view of a dual strap underride guard wrapping around the landing gear of a trailer.
Figure 12:
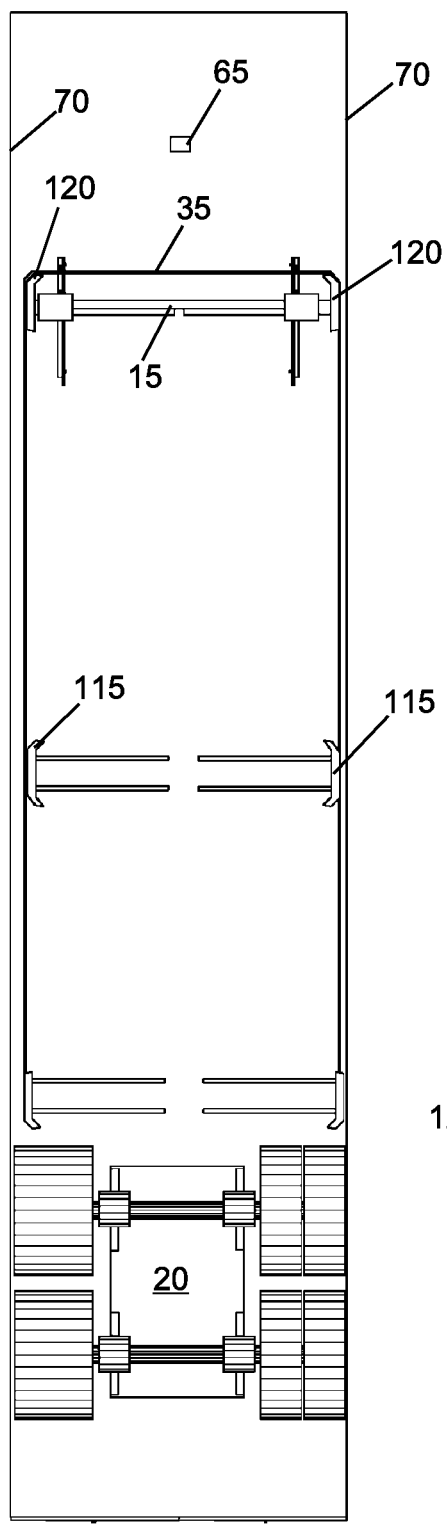
FIG. 12 shows a lower plan view of a dual strap underride guard wrapping around the landing gear of a trailer.
Figure 13:
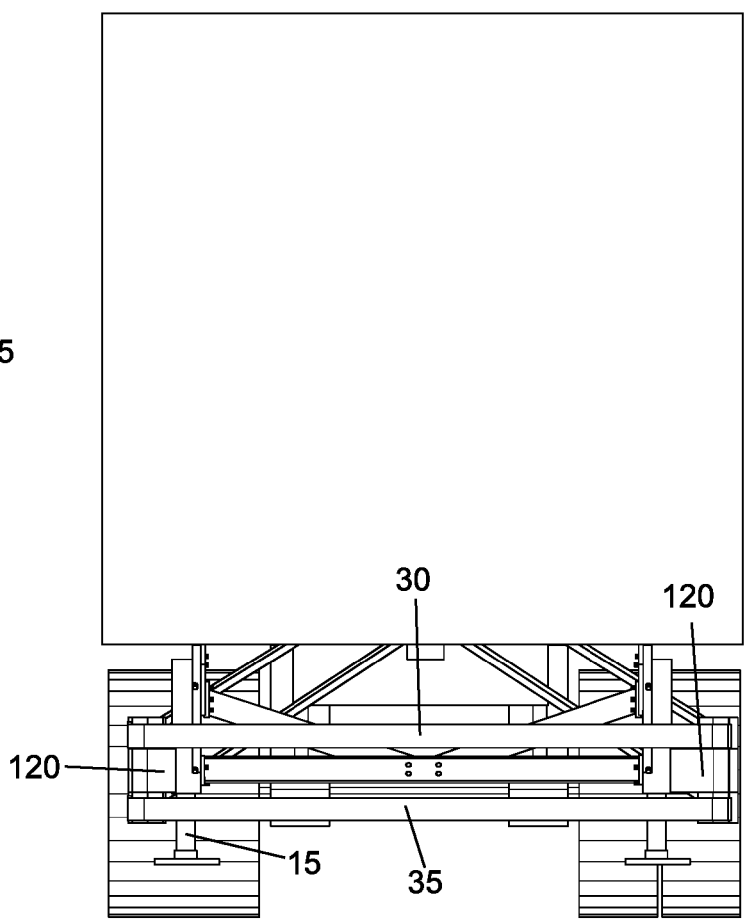
FIG. 13 shows a front elevational view of a dual strap underride guard wrapping around the landing gear of a trailer.

FIGS. 11 through 13 illustrate an embodiment of the invention where the strap (30, 35) wrap around the landing gear 15 of the trailer to add further underride protection near the front of the trailer. While the landing gear of the trailer may provide some underride protection, the landing gear is designed to support the stationary weight of the trailer and may provide only minimal underride protection based upon the angle of vehicle impact. In the illustrated example, the aft supports 45 are similar to those shown in FIGS. 1-10, however the angled support 120 is distinct from the fore supports 40 shown in the previous examples. While the angled support 120 contacts the upper and lower straps (30, 35) like the fore supports 40, the straps bend about the angled support 120 to pass in front of the landing gear. Like the fore supports 40, the angled supports 120 may include structures for tensioning the straps (30, 35) however such mechanisms are not required.

The angled supports 120 may allow the straps (30, 35) to freely move relative to the angled supports 120. For example, if un-tensioned straps were attached to the left and right aft supports 40 and the left and right-angled supports 120, and then the straps were tensioned at the right aft support, the straps would likely move a small amount in a circuit around the track created by the supports. Allowing free movement of the straps assists in equalizing the tension of the straps on the left and right sides of the trailer. In addition to allowing free movement of the straps, the angled supports 120 may also include structures that are specifically configured to assist with the movement of the straps. In one embodiment, the angled supports 120 include roller surfaces that support the straps and allow the straps to freely move during the tensioning process.

In yet another embodiment, the angled supports 120 include both roller surfaces to facilitate movement of straps during tensioning and clamping structures to limit the movement of the straps after tensioning at the aft supports has occurred. By limiting the movement of the straps at the angled supports 120 after tensioning, the effective overall length of the straps is decreased so that the spring constant of the straps is increased. With a higher spring constant, the amount of deceleration force applied by the straps to a vehicle during a crash is increased.

In the embodiment shown in FIGS. 11-13, the angled supports 120 are shown directly secured to the landing gear of the trailer, however it should be appreciated that in alternate embodiments the angled supports 120 may be secured to the underside of the cargo container 10 via fore and aft support structures (55, 60) similar to those that are shown in the fore and aft supports (40, 45). Additionally, the aft support 45 may be secured to the wheel assembly 20 or the slide rail (not shown) that connects the wheel assembly to the cargo container 10. By directly securing the aft support 45 to the wheel assembly, the distance between the two elements is fixed regardless of where the wheels are positioned. Aft supports 45 that are directly secured to the underside of the cargo container 10 may need to be located in front of the forwardmost position of the wheel assembly. In such an embodiment, there may be a significant gap between the aft supports 45 and the wheel assembly 20 when the wheel assembly is in its rearward most position, however such a gap is not expected to be large enough to allow for a vehicle to underrun the cargo container 10.

Figure 14:
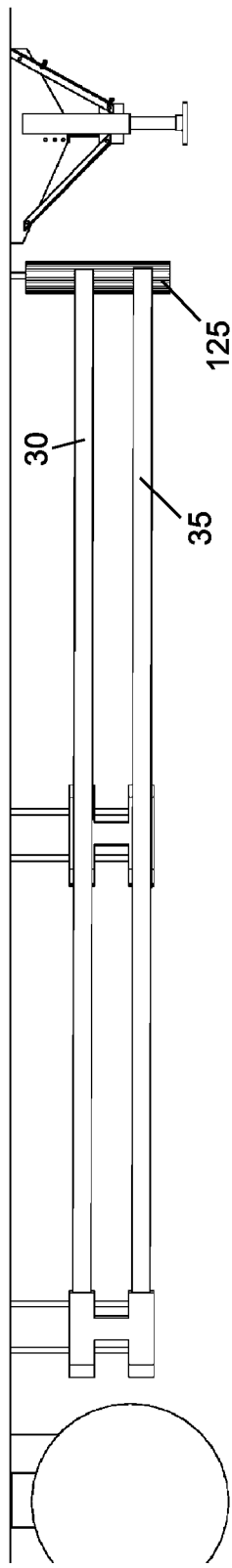
FIG. 14 shows a side elevational view of a dual strap underride guard having a tensioner near the landing gear of the trailer.
Figure 15:
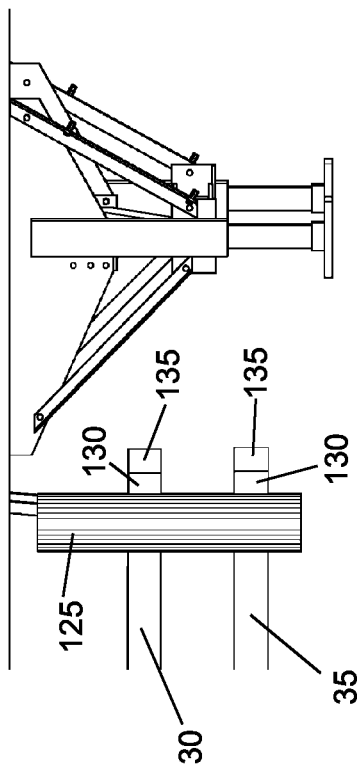
FIG. 15 shows a side elevational view of a dual strap underride guard having a tensioner with integrated tension indicators.
Figure 16:
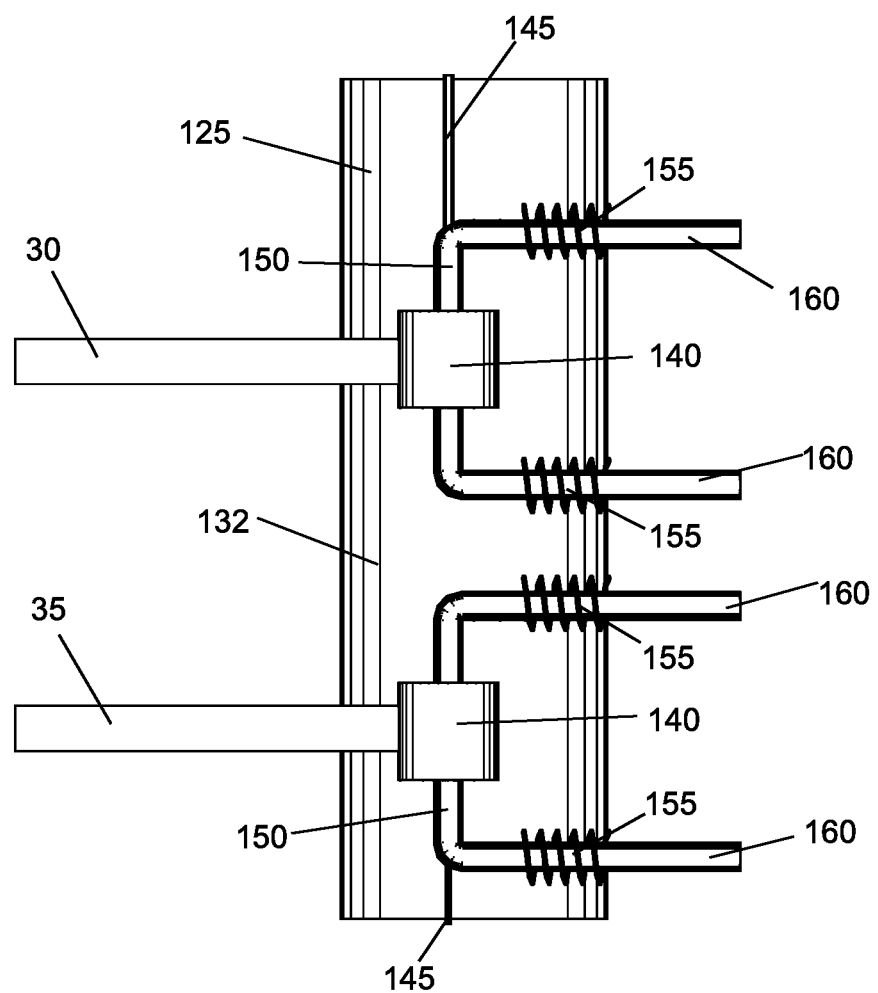
FIG. 16 shows a side cross-sectional view of a strap tensioner having integrated tension indicators.
Figure 17:
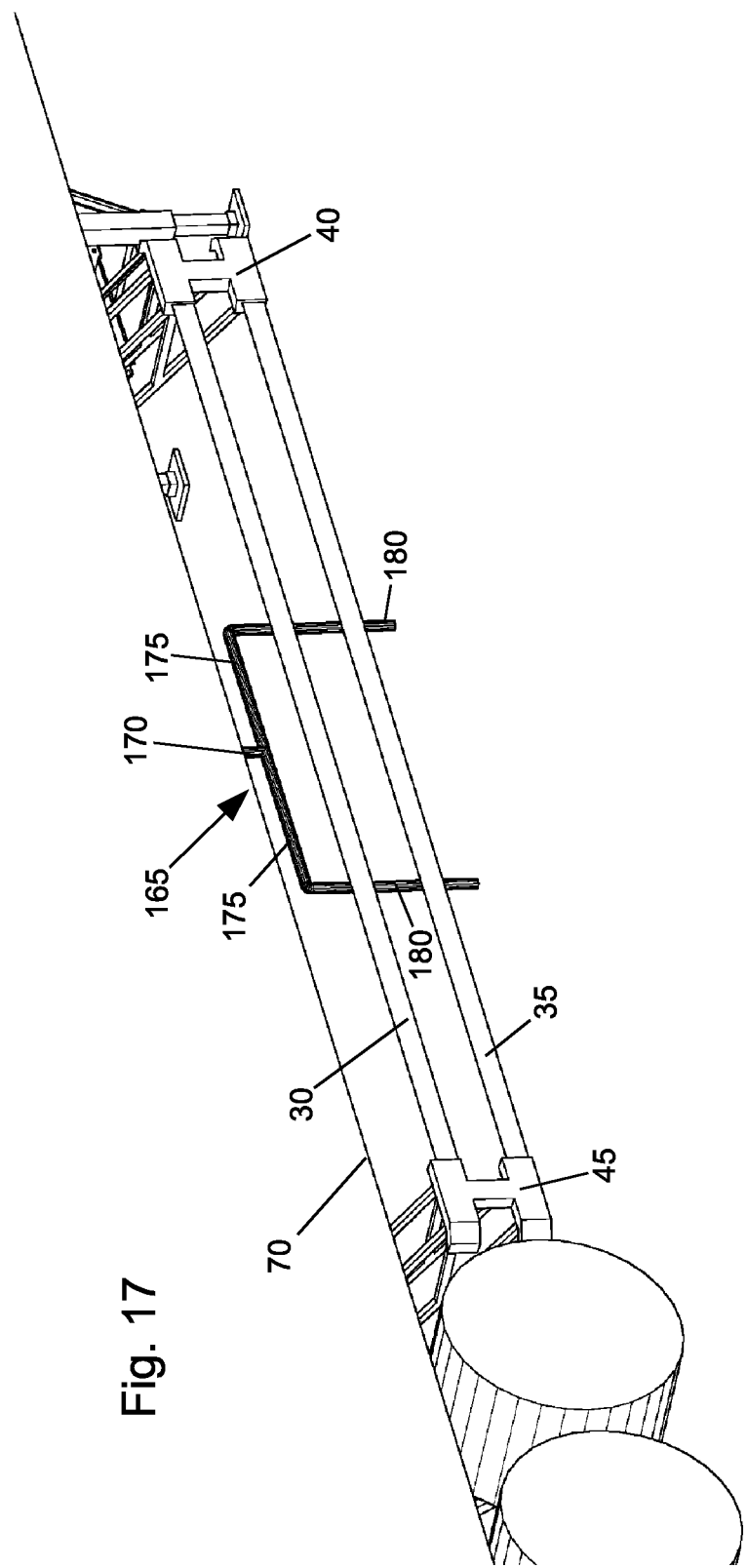
FIG. 17 shows an upper perspective view of a dual strap underride guard having a spinning tensioner.

FIGS. 14 through 16 show an embodiment of the invention with a cylindrical tensioning system 125 located near the landing gear 15 of the trailer. In the example shown in FIG. 14, the cylindrical tensioning system 125 is supported by a vertical bar 127 that vertically extends down from the cargo storage area of the trailer. Since the vertical bar 127 is the single linkage between the cylindrical tensioning system 125 and the cargo storage container, the vertical bar 127 is significantly more resilient than the support structures (55, 60) shown in the previous embodiments. In the illustrated example, only a single vertical tensioning system 125 is shown with an aft support 45 connecting to the other ends of the straps (30, 35), however in other embodiments of the invention, a cylindrical tensioning system may be connected to both ends of the straps (30, 35). The illustrated cylindrical tensioning system 125 receives the ends of both straps (30, 35) into an interior chamber.

FIG. 15 shows a cylindrical tensioning system 125 that includes tension indicators with first and second indicia regions (130, 135). In an exemplary embodiment of the invention, tension indicators move relative to the interior chamber of the tension indicator based on the amount of tension that is applied to the straps. If an appropriate amount of tension is applied to straps, the first indicia region 130 will be located within the interior chamber so that it is not visible (obscured) to an operator doing a routine inspection of the tensioner. In an exemplary embodiment, the first indicia region 130 will be sized (3 inches tall or greater) and colored (bright red or yellow) so that it can be easily viewed by passing police cars as the trailer travels down a highway. Due to the short distance in which a vehicle must be stopped to prevent a deadly underride, it is of key importance that the straps have an appropriate amount of pre-tensioning applied. Additionally, due to the nature of webbing that is often used in straps, over time the straps will stretch and require re-tensioning. The integrated tension indicators provide an easy notification for when additional tension needs to be applied to the straps.

While rectangular flags moving horizontally in and out of the vertical tensioning system 125 provide a simple and effective way to indicate whether the straps have an appropriate amount of tension, it should be appreciated that other systems for indicating tension level may also be used. For example, torque indicators, such as those disclosed in U.S. Pat. No. 2,679,755 issued to Mohnkern and U.S. Pat. No. 4,808,976 issued to Kiefer (the contents of which are both herein incorporated by reference) may be connected to the vertical tensioning system 125 to indicate how much torque is being applied to rollers inside the vertical tensioning system 125 and the corresponding amount of tension applied to the straps.

The upper and lower straps will likely experience slightly different environmental conditions, such as the lower strap being exposed to more road spray/debris. This may result in uneven tensioning over time, and in order to compensate, some exemplary embodiments of the invention include structures for individually tensioning the straps.

FIG. 16 illustrates a cross sectional view of an exemplary embodiment of a vertical tensioning system 125. The system includes an outer cylindrical case 132 having two slot apertures through which the upper and lower straps (30, 35) pass into the case 132. Inside the case 132, the straps (30, 35) are wound around bobbins 140 to tension the straps. In the illustrated example, each of the bobbins 140 has a vertical driver 145 that extends to an outer surface of the case 132. The vertical driver is "tensionally linked" to the strap meaning that actuation, rotation, or movement of the driver reflects or acts to directly or indirectly increase or decrease the amount of tension on the strap. A driver that is "tensionally independent" of a strap means that driver is not "tensionally linked" to the strap. By rotating the vertical driver 145, the bobbin 140 is rotated and the straps (30, 35) are tensioned. The vertical driver 145 may include features, such as a hex nut or socket that is configured to interact with a removable bar that an operator uses to turn the vertical driver. In an exemplary embodiment, the connection features on the vertical driver will be complimentary or matching to mechanism used to raise and lower the landing gear of the trailer such that a single tool may be used to both tension the straps and operate the trailer landing gear.

Although not visible in FIG. 16, vertical driver 145 includes a ratcheting system that prevents the bobbins from being rotated by the tensioned straps after the operator finishes tensioning the straps. Over the life of the trailer, it is expected that the straps may need to be replaced or removed, so the ratcheting system includes a switch or lever that allows for free rotation of the bobbins so that the straps may be de-tensioned. In another embodiment of the invention, the vertical drivers 145 are connected to small electric motors that are powered by the cargo container's electrical system. The motors act to maintain a predetermined tension level on the straps even as the straps stretch over time.

The bobbins 140 in the vertical tensioning system 125 rotate about the center portions of U-bolts 150 that are able to horizontally slide within the case 132. Resilient metal springs 155 pull the U-bolts 150 away from the slats in the case 132 such that the arms 160 extend out and away from the case 132. The arms 160 are preferably aligned such that the center of the U-bolt 150 is approximately vertical. Based on the spring 155 and the tension of the straps (30, 35), the arms 160 of the U-bolt will extend out of the case a varying amount—i.e., proportional to the amount of tension applied to the straps. Similar to the system shown in FIG. 15, the arms 160 may include indicia regions that have been calibrated to be inside or outside of the case when the appropriate threshold amount of tension has been applied to the straps. In the illustrated example, the arms 160 of the U-bolt 150 extend away from the straps (30, 35), however it should be appreciated that in an alternate embodiment of the invention, the arms 160 extend towards the straps and the springs act to push the U-bolt further into the case 132.

FIGS. 17 through 20 show a strap underride guard that includes a spinner 165 that reactively increases the tension of the straps (30, 35) in the event of a vehicle or other object underriding the cargo container. The spinner 165 includes a rotating vertical post 170 that is mounted to the underside of the cargo container. In the event of a vehicle impacting the straps, significant forces will be exerted upon the vertical post 170. In some embodiments of the invention the vertical post 170 will be constructed of high strength metal or carbon fiber and have numerous connection points to the underside of the cargo container. The connection may also include springs or other structures to inhibit the rotation of the vertical post. The connection between the cargo container and the vertical post 170 allows the post 170 to pivot about a vertical axis extending through the vertical post 170. Extending from the lower portion of the vertical post 170 are two horizontal posts 175 that extend approximately parallel to the lower side edge 70 of the cargo container. The horizontal posts 175 may have a similar construction to the vertical post 170, and in the illustrated example, the combined length of the two horizontal posts 175 is approximately equal to one third of the total separation of the fore and aft supports (40, 45). Extending downward from the distal ends of the horizontal posts are vertical impact bars 180 that press against, directly contact, or are adjacent to the upper and lower straps (30, 35). The impact bars 180 may include features that limit the movement of the straps relative to the bars, or the bars may be separated from the straps unless a vehicle is impacting the straps. In one embodiment, the vertical bars 180 include slots through which the straps (30, 35) are threaded, and in another embodiment, webbing materials, such as that used in the straps, are utilized to secure the straps to the vertical bars 180. In another embodiment of the invention, the webbing securing the straps to the vertical bars is secured to the cargo container directly above the vertical bar so that rotation of the spinner 165 causes the webbing and straps to be pulled upward along the vertical bars 180.

Figure 18:
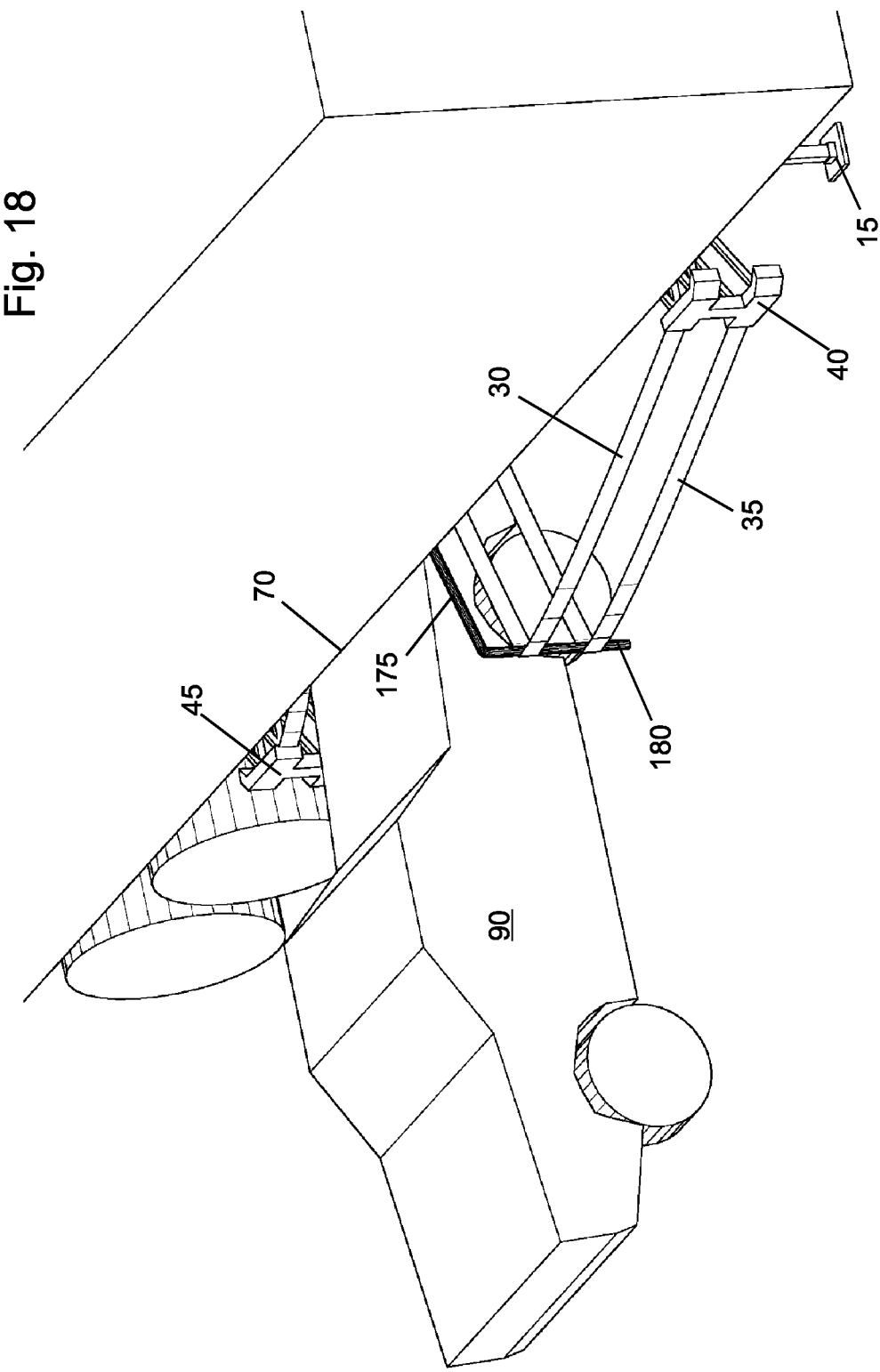
FIG. 18 shows an upper perspective view of a vehicle impacting a trailer with a dual strap underride guard having a spinning tensioner.
Figure 19:
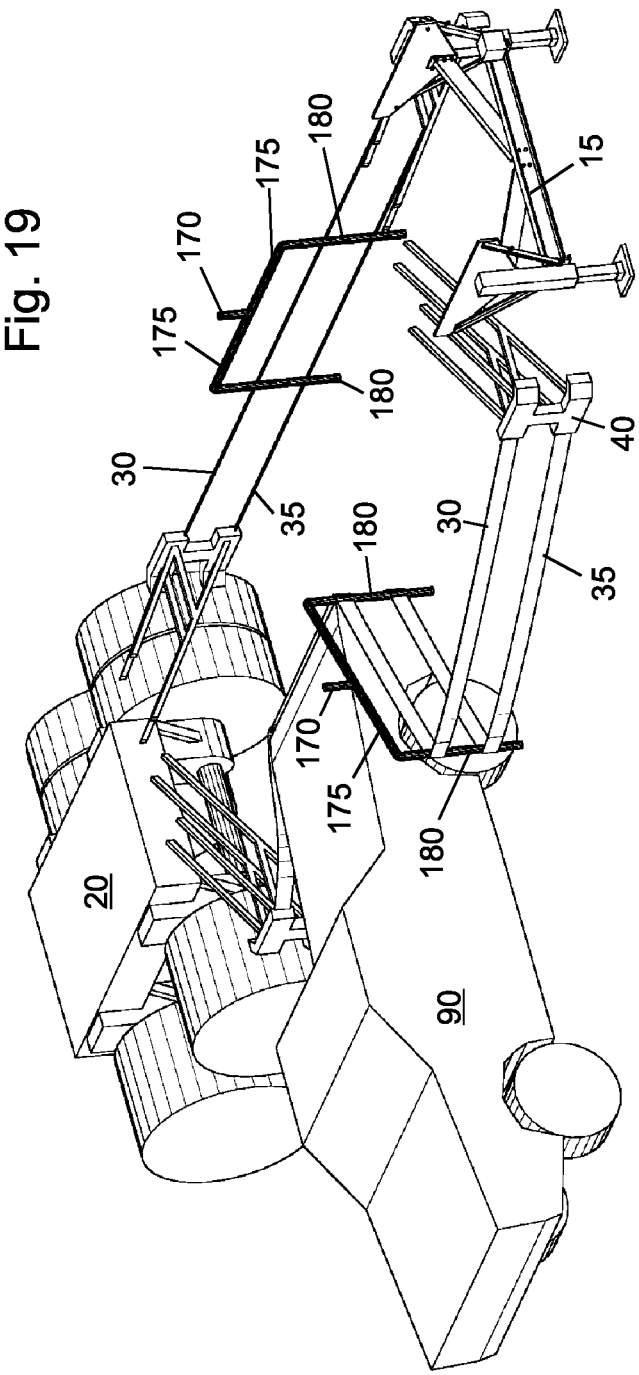
FIG. 19 shows an upper perspective view of a vehicle impacting a transparent trailer with a dual strap underride guard and spinning tensioner.
Figure 20:
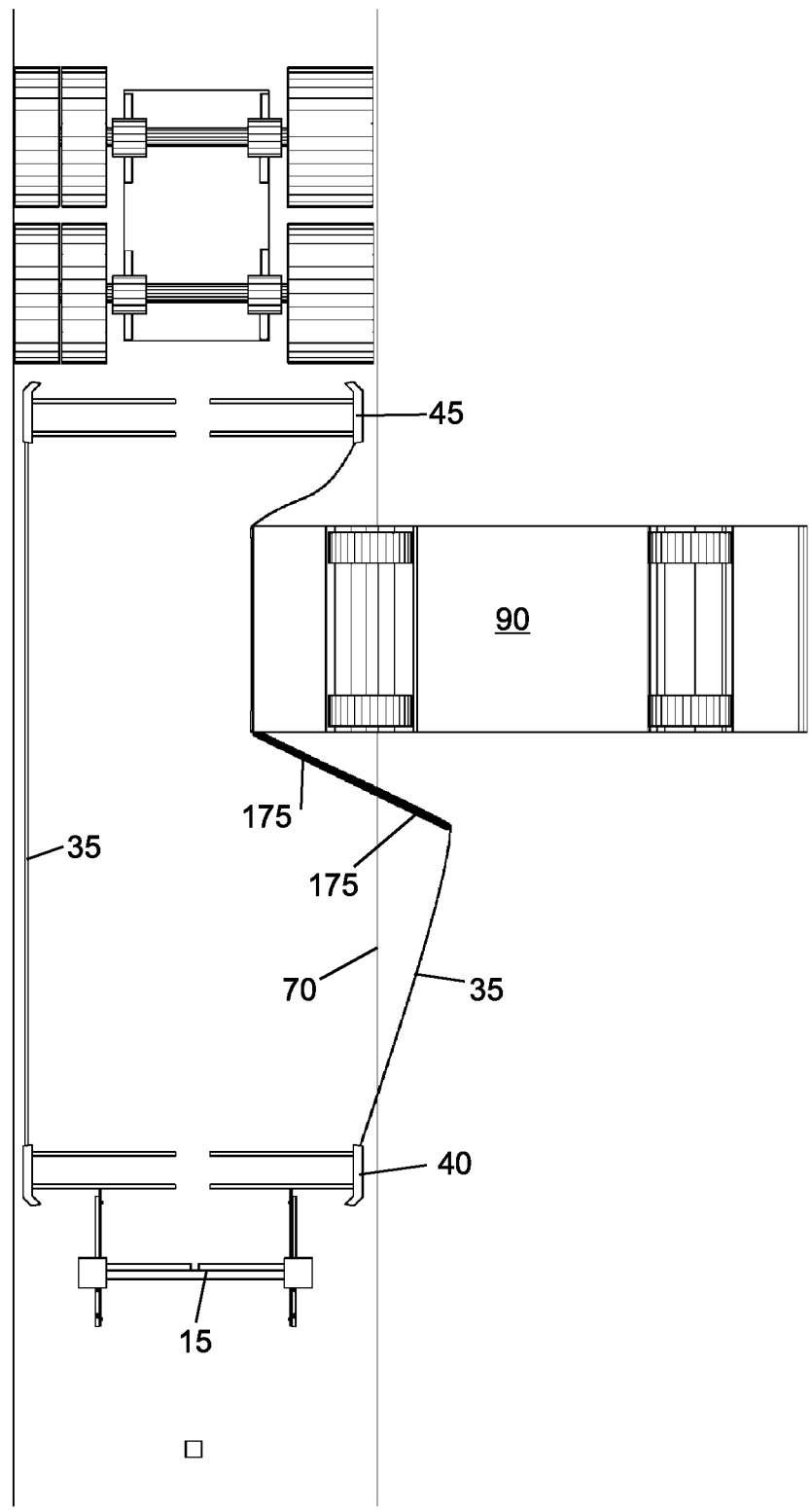
FIG. 20 shows a lower plan view of a vehicle impacting a trailer with a dual strap underride guard having a spinning tensioner.

FIGS. 18 through 20 show a vehicle 90 impacting a strap underride guard that utilizes a spinner 165. As the vehicle 90 impacts the upper and lower straps (30, 35), the straps press upon the vertical bars 180 of the spinner 165 with unequal forces causing the vertical bar 180 closest to the vehicle to rotate towards the interior of the cargo container while the other vertical bar rotates outward about the vertical axis that passes through the vertical post 170. The vehicle impacting the straps causes an inward stretching of the straps and the outward rotation of the vertical bar causes an additional stretching of the straps. Based on Hooke's law, the deceleration force applied to the impacting vehicle will be proportional to the total amount of stretching of the straps. By causing additional stretching in the straps, the deceleration forces applied by the straps are increased. Additionally, since the spinner 165 rapidly stretches the straps during impact, the amount of pre-tension on the straps may be decreased. While pre-tensioning increases the deceleration forces applied by the straps during a crash, the constant tension on the strap may cause them to degrade or break down faster than a strap not under significant tension.

While the spinner illustrated in FIGS. 17 through 20 is one example of a reactive tensioning system, other systems may be utilized to reactively increase the tension during a crash. For example, in one embodiment of the invention, a spring is pre-compressed with ten thousand pounds of force or more. The spring is secured to the strap attachment structure on the I-connector and prevented from expanding by a latch structure. The latch is also connected to the strap attachment structure and is configured to release when the strap pulls on the strap attachment structure with a force in excess of a thousand pounds, as an example. Once the pull on the strap exceeds 1,000 pounds of force, the latch releases the spring and the 10,000 pounds of spring force pushes and locks the strap attachment into a second location causing the tension on the strap to significantly increase. In another embodiment, the aft structure includes a reactive tensioner that moves the strap attachment point 18 inches closer to the wheel assembly when the tension on the straps exceeds 1,500 pounds.

Figure 21:
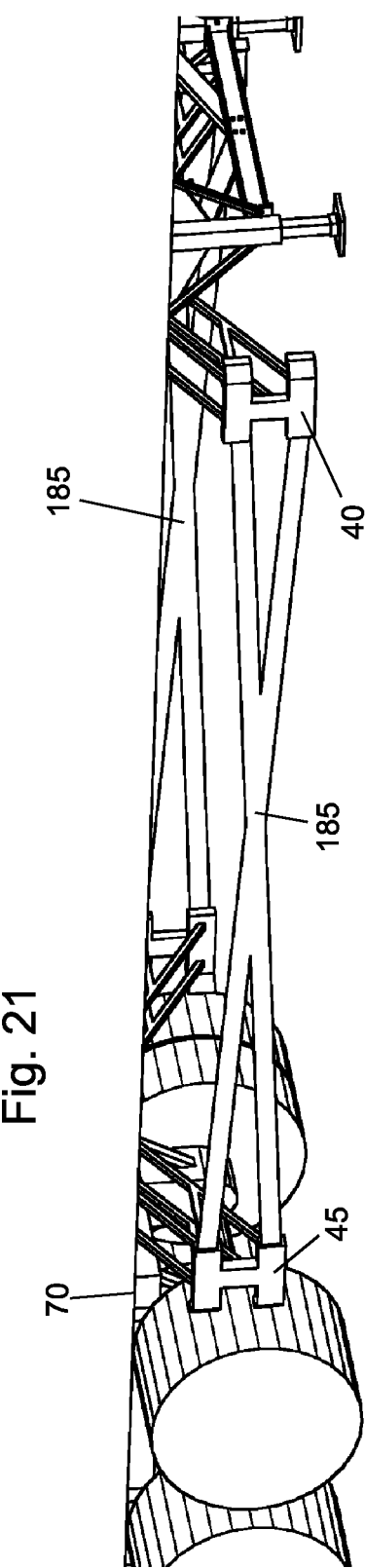
FIG. 21 shows a side perspective view of a dual strap underride guard with crossed straps.
Figure 22:
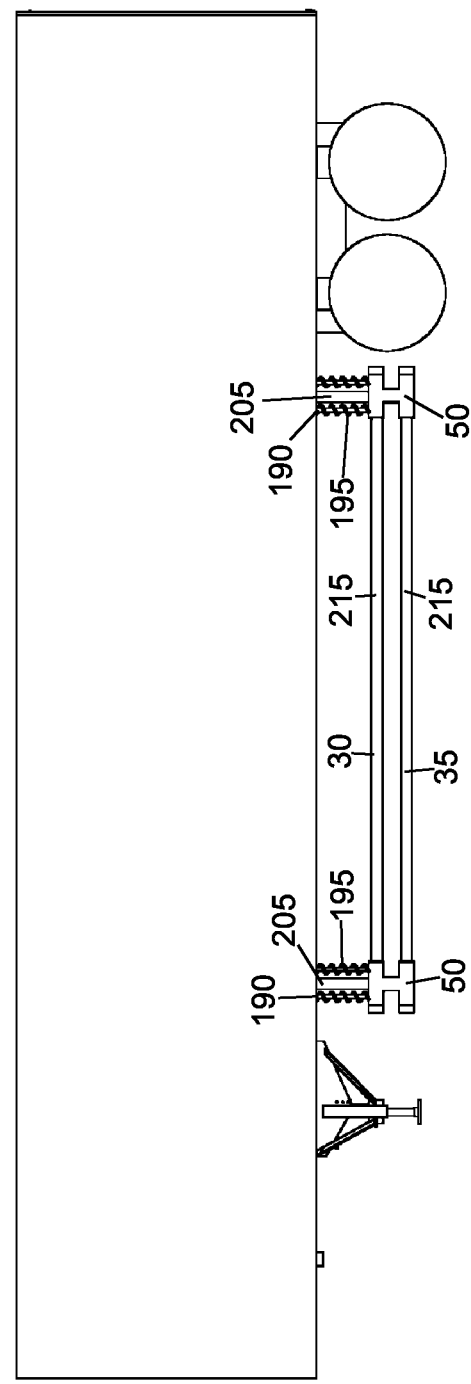
FIG. 22 shows a side elevational view of a lifting dual strap underride guard.

FIG. 21 illustrates an embodiment of the invention where the upper and lower straps (30, 35) have been crossed at a middle region 185. By crossing the straps, the elevation of the bottom of the straps at the mid-point of the trailer is higher than the elevation of the bottom of the straps near either the wheel assembly or landing gear. When the trailer is transported, the mid-section is the portion of the straps most likely to scrape against the ground (such as at railroad crossings). By elevating the middle region 185, the overall elevation of the supports (40, 45) may be lowered to help prevent underrides of low riding vehicles, such as sports cars.

Figure 25:
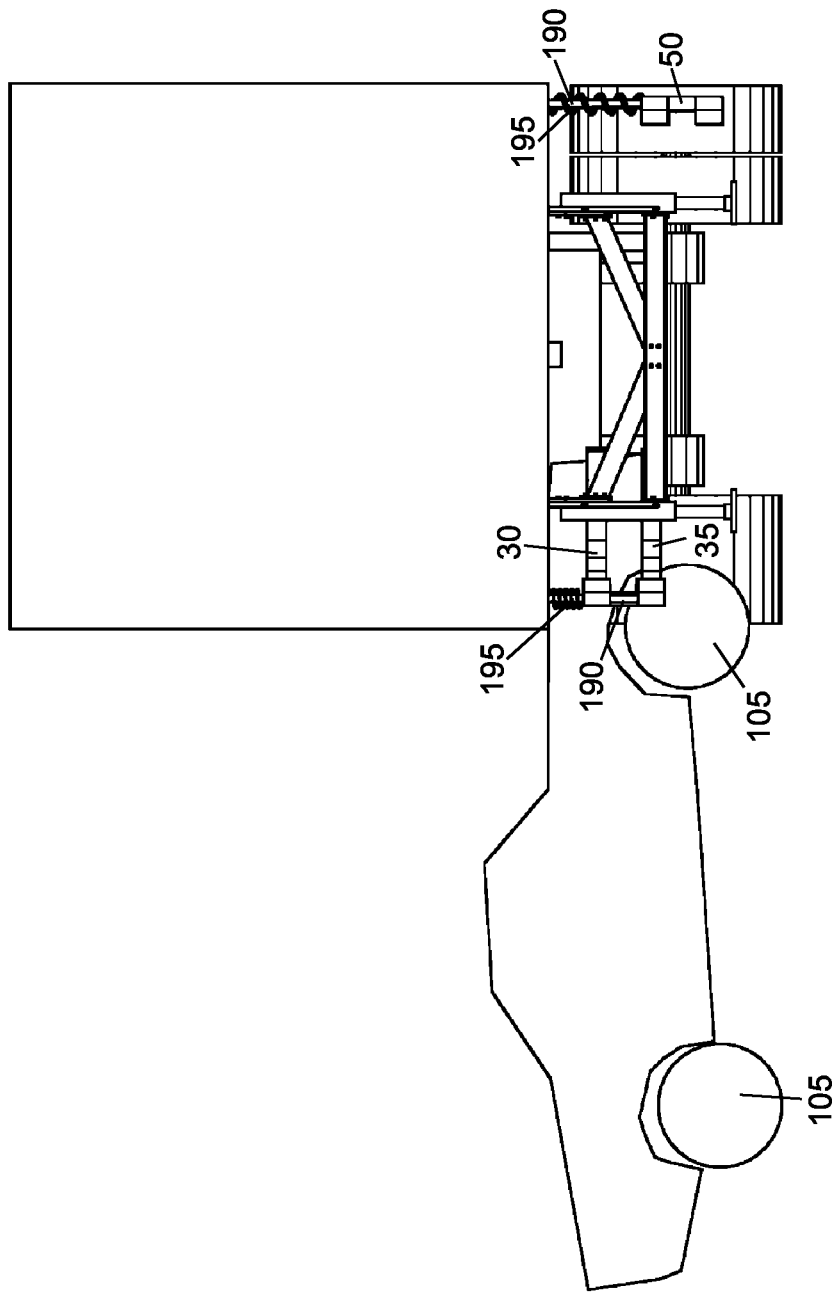
FIG. 25 shows a front elevational view of a vehicle impacting a lifting dual strap underride guard.
Figure 26:
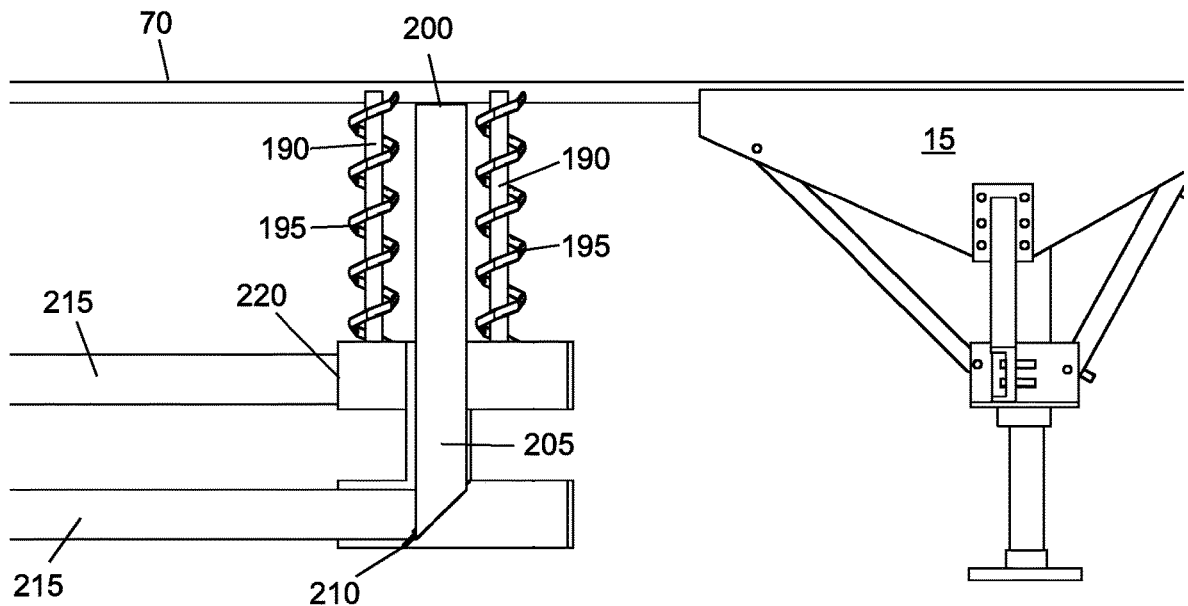
FIG. 26 shows a side elevational view of a portion of a lifting mechanism for a dual strap underride guard.
Figure 27:
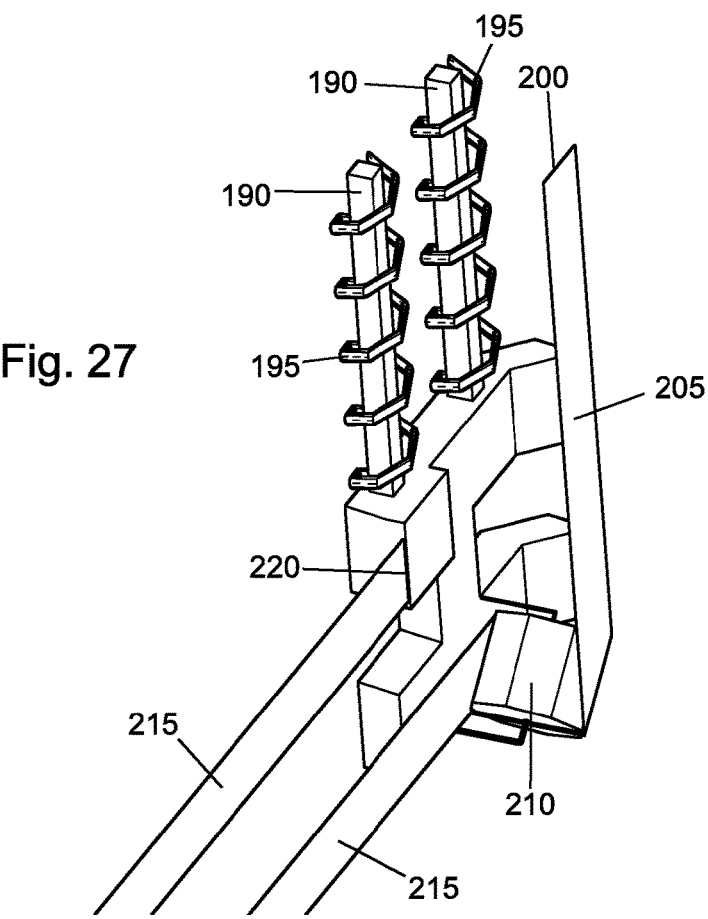
FIG. 27 shows a side perspective view of a portion of a lifting mechanism for a dual strap underride guard.

FIGS. 22 through 27 illustrate an example of a vertically reactive strap underride guard. In the illustrated example, the I-connector 50 are connected to the underside of the cargo container 10 via vertical posts 190 that allow the I-connectors 50 to move up and down. Springs 195 extend between the bottom of the cargo container and the top of the I-connectors 50 an act to bias the I-connectors 50 downwards. As best shown in FIGS. 26 and 27, the top ends 200 of the straps (30, 35) are secured to the bottom of the cargo container. The straps have a vertical region 205 that spans from the end 200 to an angled rotor 210 on the I-connector 50. The straps then have horizontal regions 215 that span the length of the trailer to the other I-connector where their lower ends 220 are secured. In the illustrate example, the lower strap connects to the underside of the cargo container above the fore support 40 while the upper strap connects to the underside of the cargo container above the aft support 45, however it should be appreciated that the opposite configuration may be used, or that in some embodiments both the upper and lower straps will be secured above a single support.

FIGS. 23 through 25 illustrate a vehicle 90 impacting the vertically reactive strap underride guard. When the vehicle first contacts the straps (30, 35) the I-connectors 50 are in their lowest position because the downward force applied by the springs 195 is greater than the upward force exerted by the angled rotor 210 due to the tension of the straps. As the vehicle underrides the cargo container, the straps (30, 35) stretch increasing their tension and causing the angled rotor 210 to exert significantly more upward force on the I-connectors 50. The force exerted by the angled rotor 210 overcomes the downward force of the springs 195 and the I-connectors 50 slide up the vertical posts 190 causing the straps (30, 35) to also rise.

As the I-connectors 50 are rising due to increased tension, the straps are firmly pressed against the front end 102 of the vehicle 90 causing upward forces to be applied to the front end of the vehicle. As shown in FIG. 25, the front wheels 105 are lifted up significantly relative to the back wheels such that the front compartment of the vehicle is impacting the underside of the cargo container. By causing the vehicle to impact the underside of the cargo container, additional decelerating forces are applied to the vehicle to prevent the passenger compartment of the vehicle from underriding the cargo container.

FIGS. 26 and 27 show an alternate embodiment of a strap underride guard. The fore support includes a vertical bar 230 that extends down from the underside of the cargo container. The vertical bar 230 is supported by lateral and angled bars (235 and 240, respectively) that extend from the vertical bar to locations on the underside of the cargo container. Horizontal apertures pass through the vertical bar 230, and threaded bolts 245 pass through the apertures. Nuts 250 are threaded onto the bolts 245 to secure the bolts in the apertures. Secured to the bolts 245 are base plates 255 onto which press plates 260 may be secured. Sandwiching the straps between the press plate 260 and the base plate secures the straps to the support. The aft support has a construction similar to the fore support with a vertical bar 265 that extends downward from the underside of the container.

Lateral and angled bars (270 and 275) extend from the vertical bar 265 to locations on the underside of the cargo container. A horizontal bracket 280 extends from approximately the vertical bar 265 away from the fore support. Passing through the bracket 280 are two threaded bolts 285 having press plates 290 secured to the straps on a first end and nuts 295 on the opposite ends. Between the nuts 295 and the brackets 280, springs 300 act to push the nut ends of the threaded bolts 285 away from the bracket 280 to tension the straps 305. By rotating the nuts (250, 295), the amount of tension applied to the straps may be increased or decreased.

In the event of a crash, the springs 300 compress and decrease the amount of tension on the straps. The softened tension provided by the springs is of particular use decreasing the forces exerted upon lightweight objects (bicycles, scooters, pedestrians, etc.) during an attempted underride. Such an underride guard would be particularly useful in situations where collisions with pedestrians or bicycles are much more common that collisions with automobiles. Additionally, while polyester was preferred in other embodiments due to its low elasticity, nylon may be preferred in situations where pedestrian collisions are expected due to nylon's higher elasticity.

Figure 30:
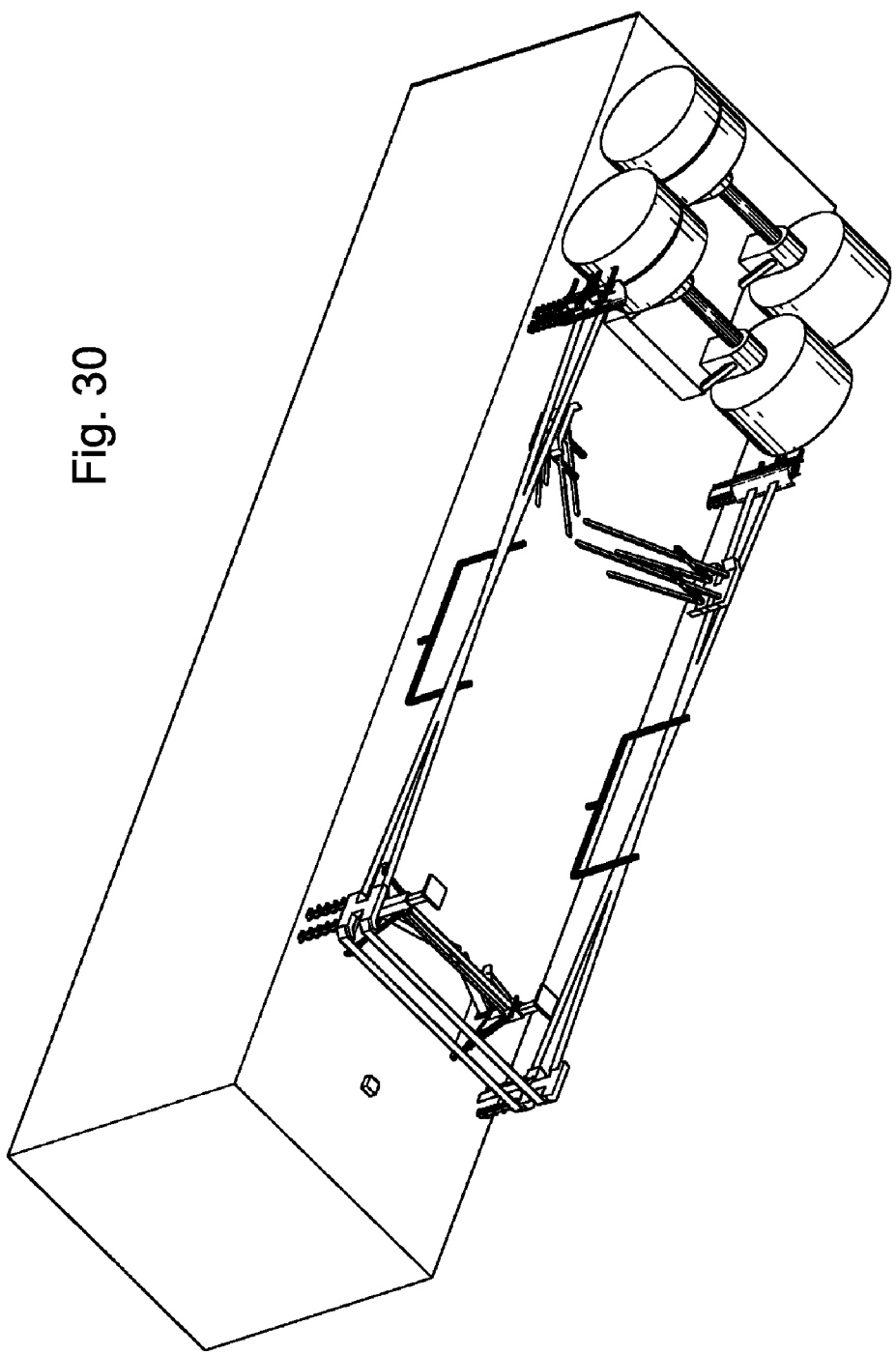
FIG. 30 shows a lower perspective view of an underride guard incorporating many of the features of the previously disclosed examples.

FIG. 30 shows an example of an underride guard incorporating many of the features from the previously disclosed examples including the straps and supports of FIGS. 1-8, the auxiliary supports of FIGS. 9-14, straps wrapped around the landing gear of FIGS. 11-13, the tensioner with tension indicators of FIGS. 14-16, the horizontally reactive tensioner of FIGS. 17-20, the crossed straps of FIG. 21, and the vertically reactive supports of FIGS. 22-27. The previous descriptions of the features are herein incorporated by reference into the description of FIG. 30.

It should be understood that the structures, processes, methods and systems described herein are not related or limited to any particular type components unless indicated otherwise. Various combinations of general purpose, specialized or equivalent components may be used with or perform operations in accordance with the teachings described herein. In view of the wide variety of embodiments to which the principles of the present invention can be applied, it should be understood that the illustrated embodiments are exemplary only, and should not be taken as limiting the scope of the present invention. For example, more, fewer or equivalent elements may be used in the embodiments.

The invention claimed is:

1. An over-the-road trailer comprising:
a frame adapted for carrying cargo;
a wheel assembly and a landing gear assembly, each connecting to the frame;
the frame having a first side extending by both the wheel assembly and the landing gear assembly;
a first fore support and a first aft support, each support extending down from the frame;
a first tensioned strap stretching from the first fore support to the first aft support parallel to and below the first side of the frame; and
a second tensioned strap stretching from the first fore support to the first aft support adjacent the first tensioned strap, wherein the first tensioned strap has a first tension, the second tensioned strap has a second tension, and the first tension is at least 10% greater than the second tension.

2. The over-the-road trailer of claim 1 further comprising the frame having a second side extending parallel to the first side;
a second fore support and a second aft support, each support extending down from the frame;
the first tensioned strap stretching from the second fore support to the second aft support parallel to and below the second side of the frame, and the first tensioned strap stretching perpendicular to the first side and the second side from the first fore support to the second fore support.

3. The over-the-road trailer of claim 1 wherein the first tensioned strap has a height and a width, and the height is at least ten times larger than the width.

4. The over-the-road trailer of claim 1 wherein the first fore support and the first aft support are both located between the wheel assembly and the landing gear assembly.

5. The over-the-road trailer of claim 1 wherein the first fore support and the first aft support apply at least 500 pounds of tension to the first tensioned strap when the first tensioned strap is parallel to the first side of the frame.

6. The over-the-road trailer of claim 1 wherein at least one of the first fore support and the first aft support includes a tension indicator.

7. The over-the-road trailer of claim 1 further comprising the frame having a second side extending parallel to the first side;
a reactive tensioner secured below the frame adjacent to the first side, the reactive tensioner including a first portion and a second portion, wherein both portions are located between the first and second tensioned straps and located adjacent to the first tensioned strap, and further wherein movement of the first portion towards the second side moves the second portion away from the second side.

8. The over-the-road trailer of claim 1 wherein
a vertically extending portion of the first tensioned strap is secured to the frame above a lifting support selected from a group consisting of the first fore support and the first aft support;
a horizontally extending portion of the first tensioned strap extending away from the lifting support parallel to the first side of the frame;
the lifting support slidably mounted on a vertical track secured to the frame;
a rotor secured to the lifting support and located between the horizontally extending portion and the vertically extending portion of the first tensioned strap, the rotor exerting an upward force upon lifting support proportional to the tension of the first tensioned strap.

9. The over-the-road trailer of claim 1 wherein the first tensioned strap is constructed of a webbing material selected from a group consisting of polypropylene, nylon, and polyester.

10. A crash-attenuating underride guard comprising:
a first webbing strap and a second webbing strap, both webbing straps horizontally extending from a first support to a tensioner;
the tensioner having a first driver tensionally linked to the first webbing strap, a second driver tensionally linked to the second webbing strap, wherein the first driver is tensionally independent of the second webbing strap and the second driver is tensionally independent of the first webbing strap.

11. The crash-attenuating underride guard of claim 10 further comprising:
a first tension indicator tensionally linked to the first webbing strap; and
a second tension indicator tensionally linked to the second webbing strap.

12. The crash-attenuating underride guard of claim 11 wherein the first tension indicator includes a first indicia region, a second indicia region, and an obscuring structure;

the tension indicator having a first state and a second state, in the first state the obscuring structure obscures the first indicia region and the tension on the first webbing strap is one of above or below a predetermined threshold, and in the second state the first indicia region is unobscured by the obscuring structure and the tension on the first webbing strap is the other of above or below the predetermined threshold.

13. The crash-attenuating underride guard of claim 10 wherein the first webbing strap has a width, a height, and a length, wherein the height is at least ten times larger than the width, and the length is at least ten time larger than the height.

14. The crash-attenuating underride guard of claim 10 further comprising a reactive tensioning structure including a first portion and a second portion, wherein both portions are located adjacent to the first webbing strap, and further wherein movement of the first portion in a first direction is specifically configured to move the second portion in a second direction opposite the first direction, wherein both the first webbing strap resists the movement of the second portion in the second direction.

15. The crash-attenuating underride guard of claim 10 wherein the first webbing strap is constructed of a webbing material selected from a group consisting of polypropylene, nylon, and polyester.

16. The crash-attenuating underride guard of claim 10 wherein the tensioner further includes a case with a first slot and a bobbin secured to the first driver, the first webbing strap wound around the bobbin and passing through the first slot, and the spring biasing the bobbin away from the first support.

17. The crash-attenuating underride guard of claim 10 wherein the first driver includes a ratcheting structure allowing rotation of the first driver in a first direction while preventing rotation of the first driver in a second direction opposite to the first direction.

18. An over-the-road trailer comprising:

a frame adapted for carrying cargo;

a wheel assembly and a landing gear assembly, each connecting to the frame;

the frame having a first side extending by both the wheel assembly and the landing gear assembly;

a first fore support and a first aft support, each support extending down from the frame;

a first tensioned strap stretching from the first fore support to the first aft support parallel to and below the first side of the frame;

the frame having a second side extending parallel to the first side;

a second fore support and a second aft support, each support extending down from the frame; and the first tensioned strap stretching from the second fore support to the second aft support parallel to and below the second side of the frame, and the first tensioned strap stretching perpendicular to the first side and the second side from the first fore support to the second fore support.

19. The over-the-road trailer of claim 18 wherein a vertically extending portion of the first tensioned strap is secured to the frame above a lifting support selected from a group consisting of the first fore support and the first aft support;

a horizontally extending portion of the first tensioned strap extending away from the lifting support parallel to the first side of the frame;

the lifting support slidably mounted on a vertical track secured to the frame;

a rotor secured to the lifting support and located between the horizontally extending portion and the vertically extending portion of the first tensioned strap, the rotor exerting an upward force upon lifting support proportional to the tension of the first tensioned strap.

* * * * *